(12) United States Patent
Das Sharma

(10) Patent No.: US 11,886,312 B2
(45) Date of Patent: Jan. 30, 2024

(54) CHARACTERIZING ERROR CORRELATION BASED ON ERROR LOGGING FOR COMPUTER BUSES

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 570 days.

(21) Appl. No.: 16/947,558

(22) Filed: Aug. 6, 2020

(65) Prior Publication Data

US 2020/0364129 A1  Nov. 19, 2020

Related U.S. Application Data

(60) Provisional application No. 63/006,531, filed on Apr. 7, 2020.

(51) Int. Cl.
  *G06F 11/00* (2006.01)
  *G06F 11/30* (2006.01)
  *G06F 11/34* (2006.01)
  *G06F 11/07* (2006.01)
  *G06F 11/10* (2006.01)

(52) U.S. Cl.
  CPC ...... *G06F 11/3027* (2013.01); *G06F 11/0787* (2013.01); *G06F 11/1004* (2013.01); *G06F 11/1044* (2013.01); *G06F 11/349* (2013.01)

(58) Field of Classification Search
  CPC ............. G06F 11/3027; G06F 11/0787; G06F 11/1004; G06F 11/1044; G06F 11/349; G06F 11/0745; G06F 11/1443; G06F 11/141; G06F 11/221
  See application file for complete search history.

(56) References Cited

U.S. PATENT DOCUMENTS

| 10,261,880 B1 | 4/2019 | Levin et al. |
| 10,409,744 B1 | 9/2019 | Gross et al. |
| 2006/0179394 A1* | 8/2006 | O'Neill ................ G06F 11/10 714/E11.032 |
| 2007/0101238 A1 | 5/2007 | Resnick et al. |

(Continued)

FOREIGN PATENT DOCUMENTS

EP  3087710 A1  11/2016

OTHER PUBLICATIONS

EPO; Extended European Search Report issued in EP Patent Application No. 20209707.7, dated May 3, 2021; 13 pages.
Jackson, Mike, et al.; "PCI Express Technology Comprehensive Guide to Generations 1.x, 2.x, and 3.0," Mindshare Press; Sep. 1, 2012; 181 pages.

(Continued)

*Primary Examiner* — Joseph D Manoskey
(74) *Attorney, Agent, or Firm* — Alliance IP, LLC

(57) ABSTRACT

Systems and devices can include forward error correction (FEC) logic to identify a correctable error in the first flit, and correct the correctable error using three error correcting code (ECC) groups. System and devices can also include an error log, the correctable error log to log a symbol number in the first flit corrected by each ECC group, and to log a magnitude of the correctable error corrected by each ECC group in the first flit; and a configuration register to log link error correlation, the link error correlation comprising a indication of one or more bits in error in the first flit.

26 Claims, 18 Drawing Sheets

(56) References Cited

U.S. PATENT DOCUMENTS

| | | |
|---|---|---|
| 2010/0162066 A1 | 6/2010 | Papirla et al. |
| 2014/0112339 A1 | 4/2014 | Safranek et al. |
| 2015/0131456 A1 | 5/2015 | Allmendinger et al. |
| 2015/0281126 A1 | 10/2015 | Regula et al. |
| 2016/0085619 A1* | 3/2016 | Lyer ............... H04L 1/0045 714/807 |
| 2016/0179610 A1* | 6/2016 | Morris ............. G06F 11/1654 714/56 |
| 2016/0179710 A1 | 6/2016 | Sharma et al. |
| 2018/0181502 A1 | 6/2018 | Jen et al. |
| 2019/0042380 A1* | 2/2019 | Das Sharma ........ G06F 11/221 |
| 2019/0149265 A1 | 5/2019 | Sharma |
| 2019/0305888 A1 | 10/2019 | Sharma |
| 2020/0012555 A1 | 1/2020 | Sharma |
| 2020/0145341 A1 | 5/2020 | Sharma |
| 2021/0133019 A1* | 5/2021 | Dykstra ............. G06F 11/0727 |

OTHER PUBLICATIONS

PCI Express Base Specification Revision 5.0, v. 1.0; pp. 97-98, 105-107, 198, 202, 233, 250; Peripheral Component Interconnect Special Interest Group; Beaverton, OR; May 22, 2019; 9 pages.
EPO; Extended European Search Report issued in EP Patent Application No. 20210637.3, dated May 28, 2021; 8 pages.
EPO; Extended European Search Report issued in EP Patent Application No. 20216645.0, dated Jun. 8, 2021; 7 pages.
USPTO; U.S. Appl. No. 17/031,822, filed Sep. 24, 2020; 55 pages.
USPTO; U.S. Appl. No. 17/086,085, filed Oct. 30, 2020; 55 pages.
USPTO; U.S. Appl. No. 17/115,168, filed Dec. 8, 2020; 63 pages.
EPO Communication Pursuant to Article 94(3) in EP Application Serial No. EP20209707.7-1206 dated May 11, 2023 (6 pages).
USPTO; U.S. Non-Final Office Action for U.S. Appl. No. 17/031,822 received on Jun. 14, 2023; 8 pages.
EPO; Extended European Search Report issued in EP Patent Application No. 20209957.8, dated May 10, 2021; 7 pages.

* cited by examiner

CHARACTERIZING ERROR CORRELATION BASED ON ERROR LOGGING FOR COMPUTER BUSES

CROSS REFERENCE TO RELATED APPLICATION

Pursuant to 35 U.S.C. § 119(e), this application claims the benefit of U.S. Provisional Patent Application Ser. No. 63/006,531, titled, "CHARACTERIZING ERROR CORRELATION BASED ON ERROR LOGGING FOR COMPUTER BUSES," filed on Apr. 7, 2020, the entire contents of which are incorporated by reference herein.

BACKGROUND

As data rates for serial links exceed 32.0 GT/s, Pulse Amplitude Modulation (PAM, such as PAM-4) with Forward Error Correction (FEC) can be used to limit an effective Bit Error Rate (BER) to an acceptable range. Forward Error Correction (FEC) is a technique used for controlling errors in data transmission over unreliable or noisy communication channels. A sender can encode a message in a redundant way by using an error-correcting code (ECC). The redundancy allows the receiver to detect a limited number of errors that may occur anywhere in the message, and often to correct these errors without re-transmission.

Figure 1:
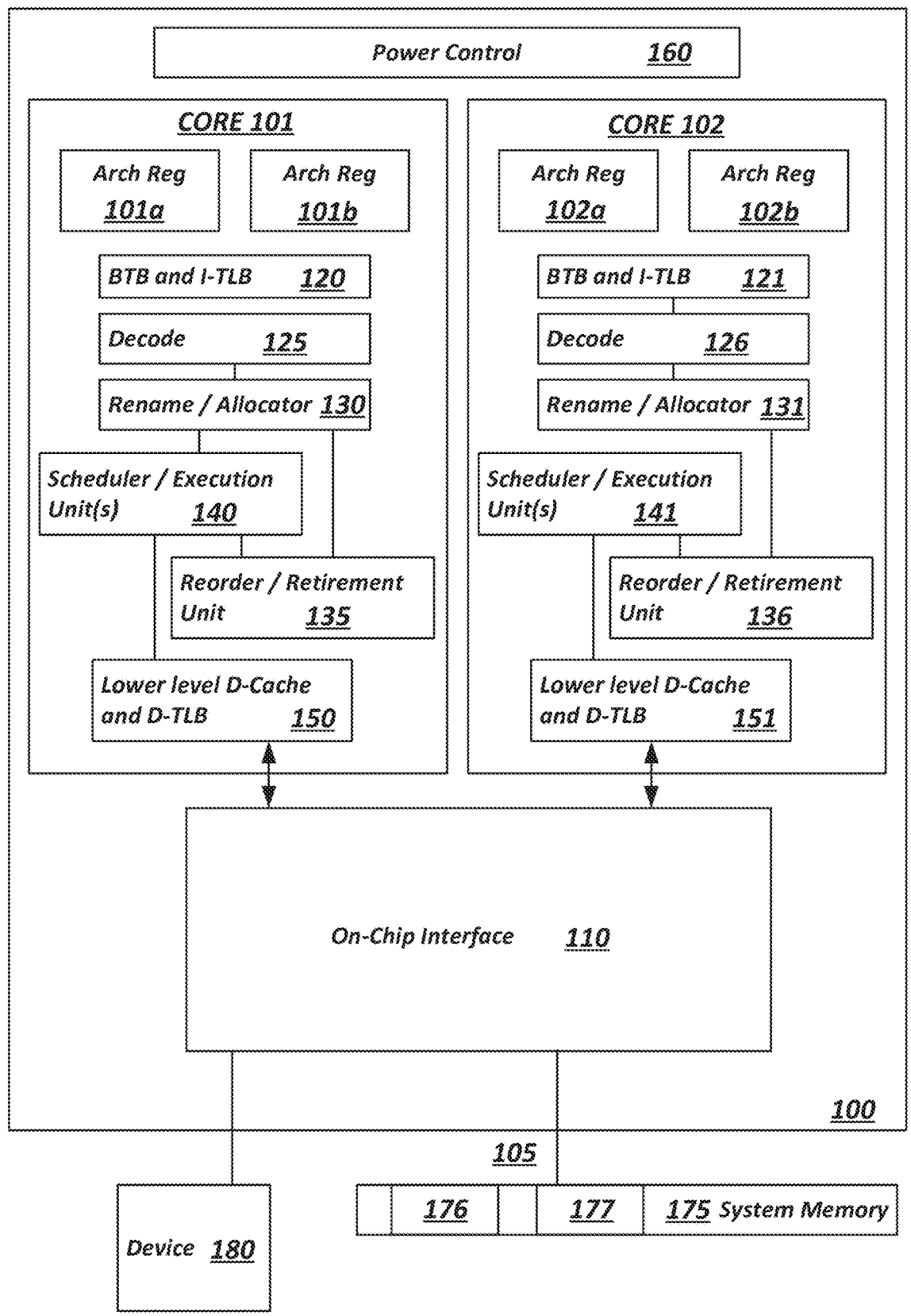
FIG. 1 illustrates an embodiment of a block diagram for a computing system including a multicore processor.

Figure are not drawn to scale.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

As serial interconnects continue to increase (double) in data rates, such as can be seen for each PCIe generation, maintaining a bit error rate (BER) of $10^{-12}$ or better with the hundreds of lanes per system on chip (SoC) becomes difficult due to various elements contributing to cross-talk, inter-symbol interference (ISI), and channel loss arising from the socket, the vias, the board, the connector, and the add-in card (AIC). With the deployment of PAM-4 encoding for the next generation data rates (e.g., PCIe (Gen 6 at 64 GT/s along with the next generation of Compute Express Link (CXL) and Ultra Path Interconnect (UPI) data rates) the target BER is much higher at $10^{-6}$. The nature of errors expected at these higher data rates are expected to be correlated between consecutive bits on the same lane (burst errors) due to the decision feedback equalizer (DFE). The nature of these errors is also expected to have correlation between errors across lanes since the lanes share the same source of error such as power supply noise, clock jitter on the TX side, etc.

This disclosure describes mechanisms and logic circuitry to address error bursts on each lane as well as across lanes during operation of the link. In addition, the disclosure describes mechanisms and logic circuitry to facilitate the evaluation of the error correlation of errors in addition to the raw first burst error rate (FBER) so that the circuits can be tuned to reduce the correlation or channel improvements can be deployed prior to shipping a product. Further, depending on the nature of correlation of errors within a lane as well as across lanes, different Forward Error Correction (FEC) can be deployed to address the errors; such FEC can include one or more (interleaved) Error Correcting Code (ECC) group(s) and/or Cyclic Redundancy Check (CRC).

This disclosure describes a mechanism to log the exact bits corrected by the FEC in two consecutive flits along with error occurrence in some consecutive flits. For uncorrected errors, the mechanisms and logic circuitry described herein can log the flit locations of the error and in cases of IDLE flits, log the locations that are non-0 which are supposed to be 0s. Furthermore, this disclosure defines a mechanism where a transmitter sends only 0s (prior to scrambling) in the flits with prior notification and the receiver so that the receiver(s) can log the exact error locations while the Link is operating in L0 state.

Advantages of the present disclosure are readily apparent to those of skill in the art. Among the various advantages include an understanding of the error correlation with a given set-up so that the circuits can be tuned to reduce the correlation or channel improvements can be deployed prior to shipping a product. Further, depending on the nature of correlation of errors within a Lane as well as across Lanes, different Forward Error Correction (FEC) and/or Cyclic Redundancy Check (CRC) can be deployed.

Figure 2A:
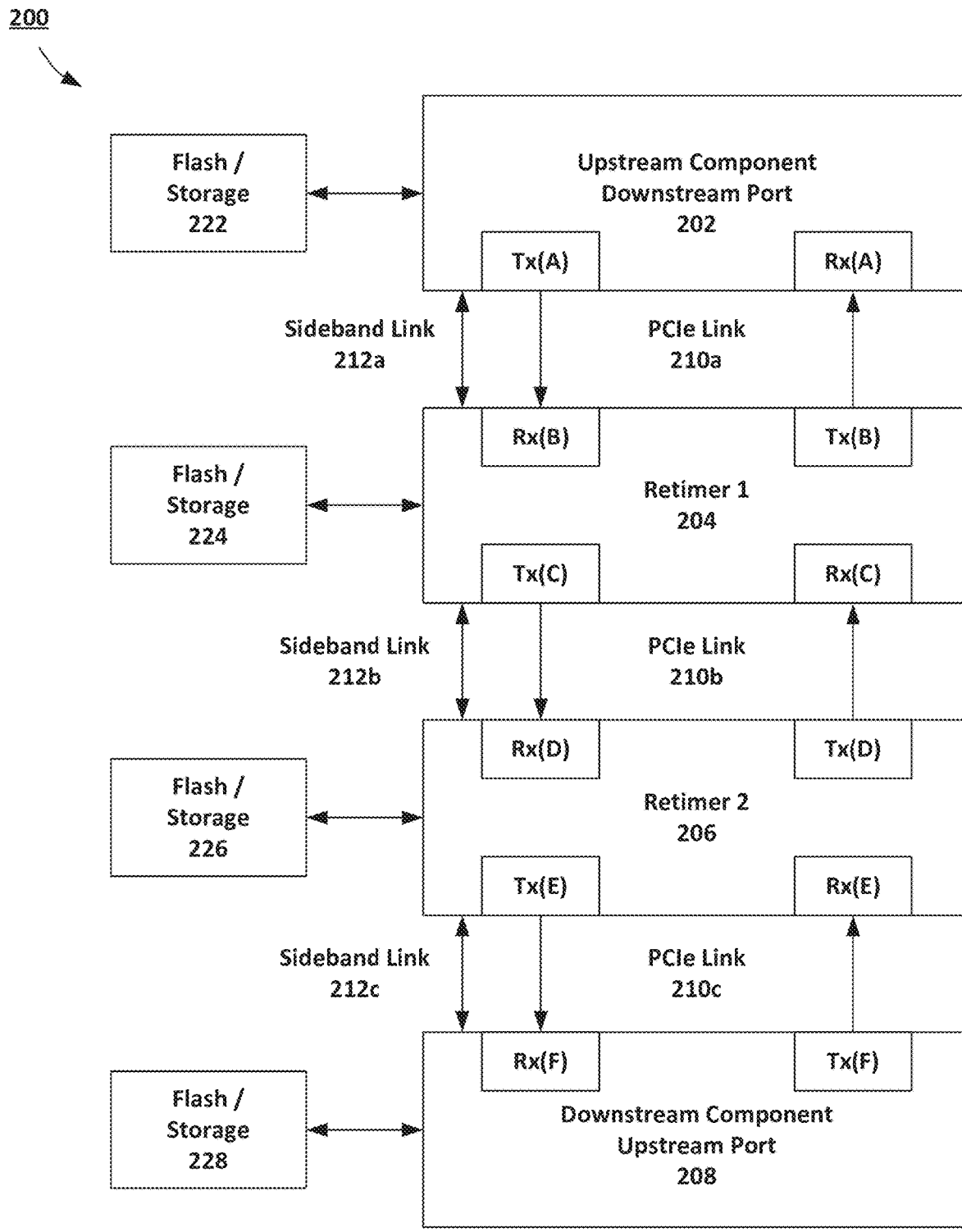
FIGS. 2A-2B are simplified block diagrams of example links that include one or more retimers in accordance with embodiments of the present disclosure.
Figure 2B:
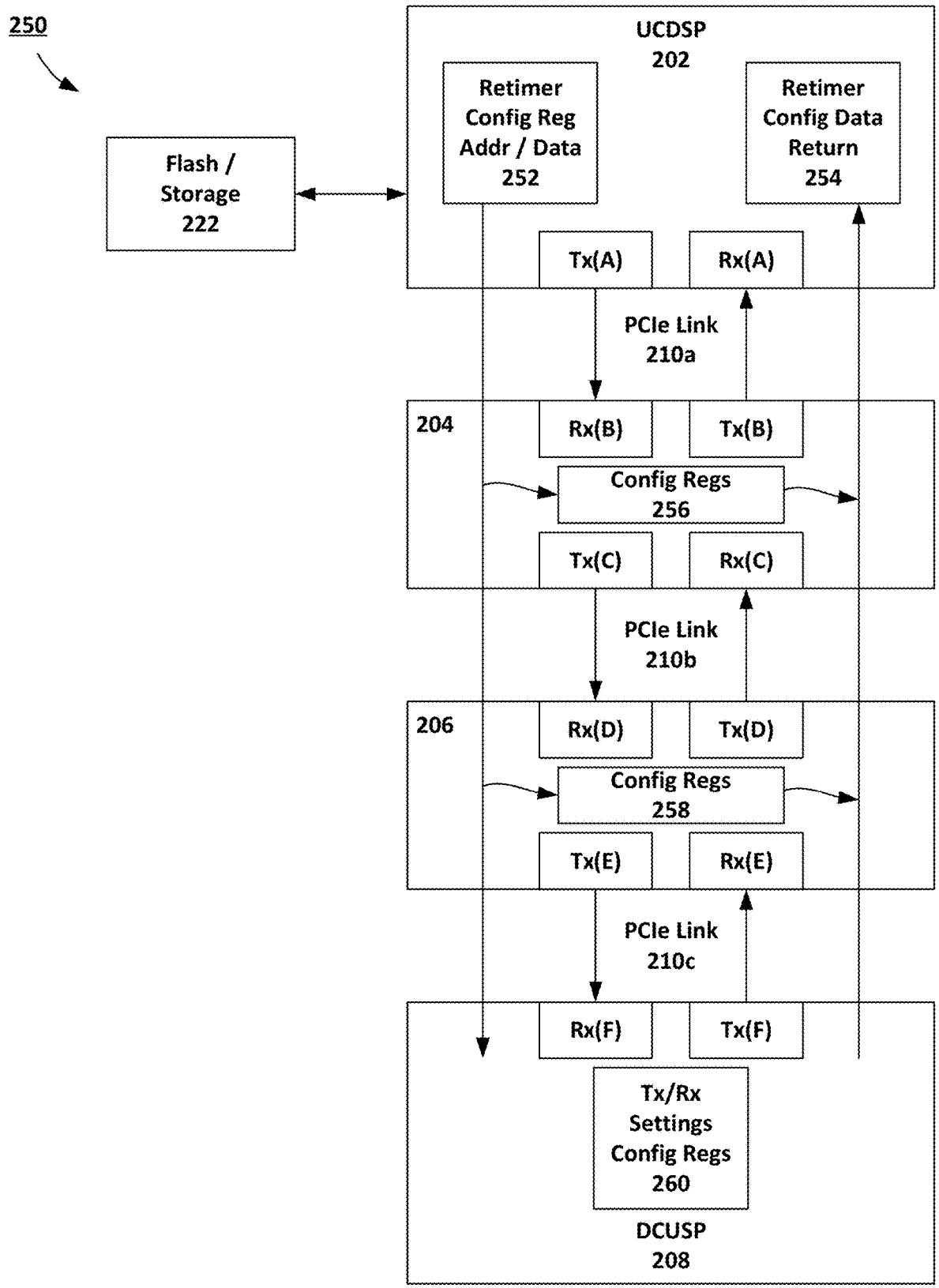

FIGS. 2A-B show a sample multilane link. If one or more retimer(s) is present, then each link segment is electrically independent and can accumulate errors in each receiver independently. Thus, with one retimer, an error may be introduced in the receiver of the retimer or the receiver of the port. Retimers operate on a per-lane basis and hence do not correct or detect any errors in the flit which operates across all lanes in the link. Though shown to include retimers, it is understood that the use of retimers is implementation-specific.

FIG. 2A is a schematic and timing diagram illustrating a sample topology 200 with two re-timers 204 and 206 between an upstream component downstream port 202 and a downstream component upstream port 208 in accordance with embodiments of the present disclosure. The upstream component downstream port 202 can be a port for a PCIe-based device, such as a CPU or other device capable of generating a data packet and transmitting the data packet across a data Link compliant with the PCIe protocol. The downstream component upstream port 208 can be a port for a peripheral component that can receive a data packet from a Link compliant with the PCIe protocol. It is understood that the upstream component downstream port 202 and the downstream component upstream port 208 can transmit and receive data packets across PCIe Link(s), illustrated as PCIe Link 210a-c.

The topology 200 can include one or more retimers 204 and 206. Retimers 204 and 206 can serve as a signal repeater operating at the physical layer to fine tune the signal from the upstream component 202 and/or the downstream component upstream port 208. A retimer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer.

The multi-Lane PCIe Link is split into three Link segments (LS) 210a, 210b, and 210c in each direction. The upstream component downstream port 202 can be coupled to retimer1 204 by a multi-Lane PCIe Link 210a. The retimer 1 204 can be coupled to retimer 2 206 by link segment 210b. And retimer 2 206 can be coupled to downstream component upstream port 208 by link segment 210c.

Components can also be coupled by sideband linkages. The upstream component downstream port 202 can be coupled to retimer1 204 by a sideband link 212a. The retimer 1 204 can be coupled to retimer 2 206 by sideband link 212b. And retimer 2 206 can be coupled to downstream component upstream port 208 by sideband link 212c.

A primary function of a retimer (buffer) device is signal re-timing. These functions are performed by retimers 204 and 206. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 204 and 206 can have an upstream path and a downstream path. In some implementations, a retimer can include two pseudo ports, and the pseudo ports can determine their respective downstream/upstream orientation dynamically. Further, retimers 204 and 206 can support operating modes including a forwarding mode and an executing mode. Retimers 204 and 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

The upstream component downstream port 202 can have access to a storage element 222, such as a flash storage, cache, or other memory device. The retimer 1 204 can optionally include a similar storage element 224. The retimer 2 206 can optionally include a similar storage element 226. The downstream component upstream port 208 can optionally include a similar storage element 228.

FIG. 2B is a schematic diagram of a connected system 250 that illustrates in-band upstream port and retimer configuration in accordance with embodiments of the present disclosure. As shown in FIG. 2A, an upstream component downstream port 202 can be coupled to the downstream component upstream port 208 by a link 210*a-c* that is extended by two retimers 204, 206. In this example, the downstream port 202 can be provided with a retimer configuration register address/data register 252 to hold data to be sent in a configuration access command to one of the two retimers using fields of an enhanced SKP OS. One or more bits of the SKP OS can include a command code, data, or an address for use at a configuration register (e.g., 256, 258) of a retimer (e.g., 204, 206, respectively) to read or write data from/to the register 256, 258. Retimers can respond to configuration access commands sent by encoding data in an instance of an enhanced SKP OS by itself encoding response data in a subsequent instance of an enhanced SKP OS. Data encoded by the retimer (e.g., 204, 206) may be extracted at the downstream port and recorded in a retimer configuration data return register (e.g., 254). The registers (e.g., 252, 254) maintained at the upstream device downstream port 202 can be written to and read from by system software and/or other components of the system allowing (indirect) access to the retimer registers: one register (e.g., 252) conveying the address/data/command to the retimer and a second register (e.g., 254) that stores the responses coming back from the re-timer. In other implementations, such registers (e.g., 260) can be maintained at the downstream component upstream port 208 instead of or in addition to the registers being maintained at the upstream component downstream port 202, among other examples.

Continuing with the example of FIG. 2B, in connection with a mechanism for providing in-band access to retimer registers, the retimer may have architected registers that are addressable with well-defined bits and characteristics. In this example, an enhanced SKP OS is defined/modified as the physical layer-generated periodic pattern to carry the commands/information from "Retimer Config Reg Addr/Data" (e.g., 252) to the re-timers and carrying the responses from the re-timers back to load to "Retimer Config Data Return" (e.g., 840), with some bits allotted for CRC for the protection of data. For example, in PCIe this can include enhancing the existing SKP Ordered Set (e.g., with CSR Access and CSR Return (CRC-protected bits)). Further, a flow for ensuring guaranteed delivery of the commands/information to retimer and the corresponding response back can be defined. The physical layer mechanism can be enhanced to also include notifications from the re-timer (in addition to response) if it needs some sort of service, among other examples features.

PCIe Gen 6 (PCI Express $6^{th}$ Generation) at 64.0 GT/s, CXL 3.0 (Compute Express Link $3^{rd}$ Generation) at 64.0 GT/s, and CPU-CPU symmetric coherency links such as UPI (Ultra Path Interconnect) at frequencies above 32.0 GT/s (e.g., 48.0 GT/s or 56.0 GT/s or 64.0 GT/s) are examples of interconnects that will need FEC to work in conjunction with CRC. In SoCs, it is highly desirable for the same PHY to be multi-protocol capable and used as PCIe/CXL/UPI depending on the device connected as the Link partner.

In embodiments of this disclosure, multiple protocols (e.g., PCIe, CXL, UPI) may share a common PHY. Each protocol, however, may have different latency tolerance and bandwidth demands. For example, PCIe may be more tolerant to a latency increase than CXL. CPU-CPU symmetric cache coherent links such as UPI are most sensitive to latency increases.

Links such as PCIe and CXL can be partitioned into smaller independent sub-links. For example, a x16 PCIe/CXL link may be partitioned to up to 8 independent links of x2 each. A symmetric cache coherent link may not support that level of partitioning. Due to the differences in latency characteristics, partitioning support, as well as due to fundamental protocol differences, these links may use different flow control unit (flit) sizes and flit arrangements, even though they may share the same physical layer.

In addition to the differing performance and operating conditions of the various protocols mentioned above, the operating conditions and performance requirements may also change for any given protocol. Operating conditions may have an impact on the error rate and correlation between errors, depending on the system and any variations in the process, voltage, and temperature. Similarly, different applications may have different latency and bandwidth requirements. This disclosure describes mechanisms that can dynamically adjust to these variations.

This disclosure describes mechanisms for detecting error patterns for correctable and uncorrectable errors in flits.

Figure 3:
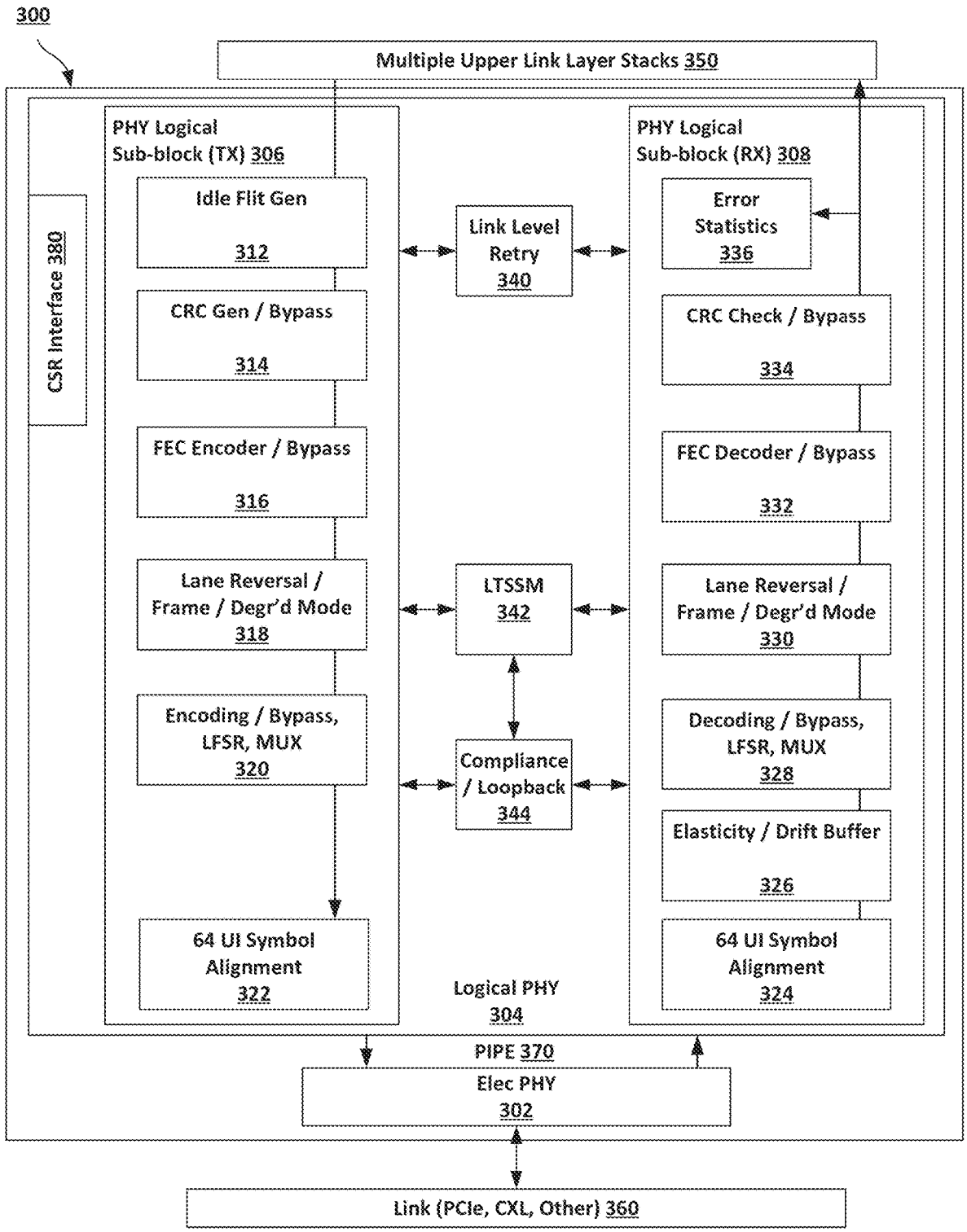
FIG. 3 is a schematic diagram of a common physical layer (common PHY) to support multiple interconnect protocols in accordance with embodiments of the present disclosure.

FIG. 3 is a schematic diagram of a common physical layer (common PHY) 300 to support multiple interconnect protocols in accordance with embodiments of the present disclosure. A PHY is an abbreviation for "physical layer," and is an electronic circuit that can implement physical layer functions of the OSI model.

FIG. 3 illustrates an example common PHY 300 (both analog PHY as well as Logical PHY) with PAM-4 encoding at higher data rates that can support multiple protocols (e.g., PCIe, CXL, UPI, Cache Coherent Interconnect for Accelerators (CCIX), Open Coherent Accelerator Processor Interface (CAPI), etc.) operating at different data rates. Both the analog PHY 302 and the Logical PHY 304 are common to each protocol supported. The analog PHY 302 can support a multi-lane link, such as an x16 PCIe link, with 48 GT/s and 56 GT/s PAM-4 for other interconnect protocols.

The logical PHY 304 can include a TX logical sub-block 306 and an RX logical sub-block 308. The TX logical sub-block 306 can include logic to prepare the data stream for transmission across the link. For example, the TX logical sub-block 306 can include an Idle Flit Generator 312 to generate flits. Flit sizes can be determined based on the protocol, bandwidth, operation conditions, protocol being used, etc. A cyclic redundancy check (CRC) code generator 314 can include one or more CRC code generators and rolling CRC code generators for generating CRC codes. CRC codes are error-detecting codes to detect accidental changes to the data. In embodiments, the CRC code generator 314 can be bypassed while maintaining clock integrity. The TX logical sub-block 306 can also include a forward error correction (FEC) encoder 316, to encode the data with error correcting code (ECC). The FEC encoder 316 can also be bypassed without compromising clock integrity. Other logical elements can also be present in the TX logical sub-block 306, such as lane reversal 318, LFSR 320, symbol alignment 322, etc. The logical PHY can also include a common retry buffer 340, since all the protocols are flit based.

The logical PHY can include an RX logical sub-block 308. RX logical sub-block 308 can include an FEC decoder/bypass 322, CRC decode/bypass 334, and an error reporting element 336. The FEC decoder 332 can decode ECC bits in received data blocks and perform error correction. The CRC decode logic 334 can check for errors that are not correctable and report errors to the error reporting element 336. The retry buffer 340 can be used to signal retry of data blocks with uncorrectable errors. Other logical elements can also be present in the RX logical sub-block 308, such as lane reversal 330, LFSR 328, elasticity/drift buffer 328, symbol alignment 324, etc.

The logical PHY 304 may also include a static mux (not shown in the figure) to choose between the different protocol stacks the PHY 300 supports. The use of a static MUX facilitates reuse of logic elements (including substantial part of what is traditionally a link layer function, such as CRC and Retry), and results in area/power efficiency in addition to the pin efficiency and flexible I/O support (the ability to choose between the different protocol depending on the system configuration). The static mux can direct data towards the appropriate physical and logical elements based on flit size associated with the protocol being used, and direct the data towards the appropriate CRC encoders/decoders and FEC encoders/decoders.

The use of a common PHY 300 (analog PHY 302 plus Logical PHY 304), the flit size, FEC, and CRC can be potentially different between different protocols and operating conditions. Any additional logic to facilitate the common PHY is less costly than replicating the logical PHY stack multiple times for each protocol. Instead, data can be directed electrically to the appropriate encoders/decoders based on the protocol being used, which is set initially during link initialization.

Figure 4A:
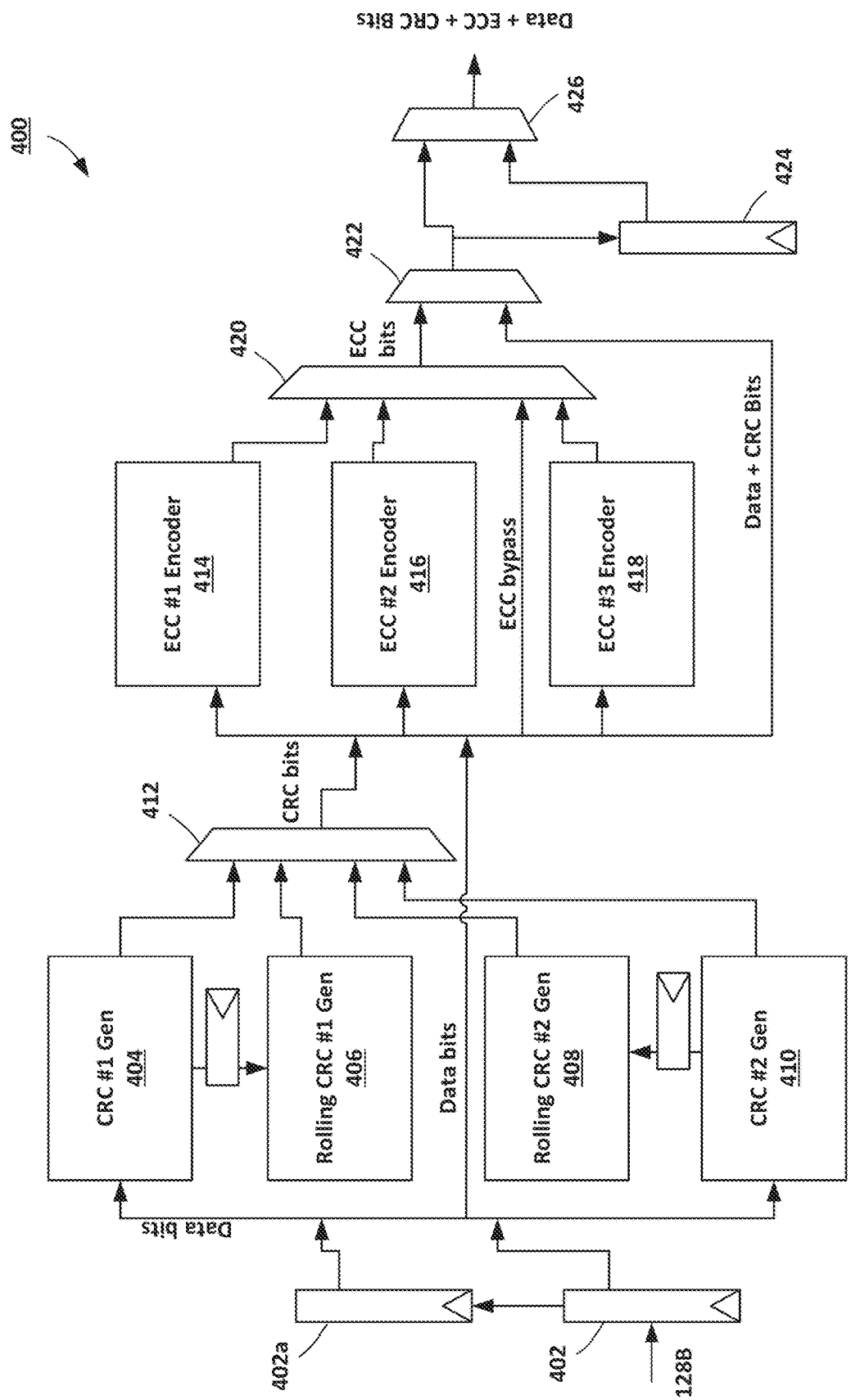
FIG. 4A is a schematic diagram of a transmitter-side logical sub-block of a common PHY in accordance with embodiments of the present disclosure.

FIG. 4A is a schematic diagram of a transmitter-side logical sub-block 400 of a common PHY in accordance with embodiments of the present disclosure. Transmitter-side logical sub-block 400 is similar to the TX logical sub-block 306 described above. FIG. 4A illustrates how data can traverse the transmitter-side logical sub-block 400 based on operating conditions.

As an example, consider two flit sizes: 128B and 256B that can be assigned to different protocols or even the same protocol. For example, PCIe may run with only 256B flit size; CXL may operate either as 128B or as 256B flit size depending on the operating conditions (e.g., a higher error rate may move us towards 256B flit size to better amortize more FEC bits to correct more errors and more CRC bits for a stronger CRC), and UPI may be 128B. The data path, including the ECC and CRC logic, is capable of handling multiple flit sizes. Even though two flit sizes are provided as an example, those skilled in the art will recognize that the techniques work for a single flit size as well as more than two flit sizes.

In this example, the transmitter-side logical sub-block 400 includes two CRC generators: CRC #1 Gen 404 and CR #2 Gen 410. CRC #1 Gen is based on GF(2), which is useful if the errors manifest themselves as independent errors on each lane (i.e., the correlation of errors in a Lane after FEC is low). CRC #2 is based on $GF(2^8)$, which is useful if errors in a lane are bursty. Each CRC generator also has its rolling CRC variation (e.g., Rolling CRC #1 Gen 406 and Rolling CRC #2 Gen 408), where the underlying CRC is not sufficient from a reliability perspective. Rolling CRC generators can generate CRC code based on its respective CRC generator but using a different polynomial of the same order.

A received flit (F1) is accepted only after its CRC is good and the CRC from its subsequent flit (F2), after operating F1 with a different polynomial, is also good. There is also a provision for bypassing the CRC here if the upper layer stack wants to have its own separate check and does not need the CRC decoder in the PHY. Even though in this example, four types of CRCs (two types of CRCs, each with its rolling CRC variant), those skilled in the art will recognize that more or fewer CRCs can be used, depending on the requirements.

Further, in this example, 3 types of FEC encoders are used: ECC #1 414, ECC #2 416, and ECC #3 418. An option to bypass FEC is also provided if the measured error rate is acceptable. For example, the bandwidth demand on the link running a UPI protocol may be such that the link can operate at 48.0 GT/s, and the measured raw burst error rate is $10^{-9}$ at 48.0 GT/s. In that example, FEC can be bypassed, and the CRC with retry is relied on to correct errors, rather than to pay a latency and bandwidth penalty for all flits. Thus, even for any given flit size, the number of bits in the flit that can be used for the data and/or data+control information payload can be different depending on the number of bits used for FEC (0 if FEC is not used) and the CRC.

ECC #1 414 in this example can be a 3-way interleaved ECC with single symbol correct capability. This type of ECC encoder can be used if the errors in a lane are correlated enough and occur with a burst length of <=16 with a high enough probability to meet the reliability needs. ECC #2 416 can be a double bit correcting BCH code which would be used if precoding with PAM-4 is used and results in a very high percentage of errors in a given lane converting to two bit flips. ECC #2 416 can have the same low-latency characteristics as ECC #1 414 but is more efficient than ECC #1 414. ECC #2 416 can also work well if the burst length is >16. However, ECC #1 414 is a better alternative if the errors after precoding do not result in two bit flips but in multiple bit flips in a lane. ECC #3 418 can be a 2-way interleaved double-Symbol correcting BCH code which will be used if the raw burst error rate is low (i.e., $10^{-4}$-$10^{-5}$ range) since there may be a high probability of multiple symbol errors, even though it has a higher latency penalty than ECC #1 414 or ECC #2 416. Even though in this example, there are three flavors of ECCs, those skilled in the art will recognize that the number of ECCs can be more than three or fewer than three, depending on the requirements.

To accommodate various flit sizes, buffers can be used. For example, for a 128B flit, a single buffer 402, 424 can be used. For a 256B flit, two 128B buffers can be used: 402 and 402a.

Figure 4B:
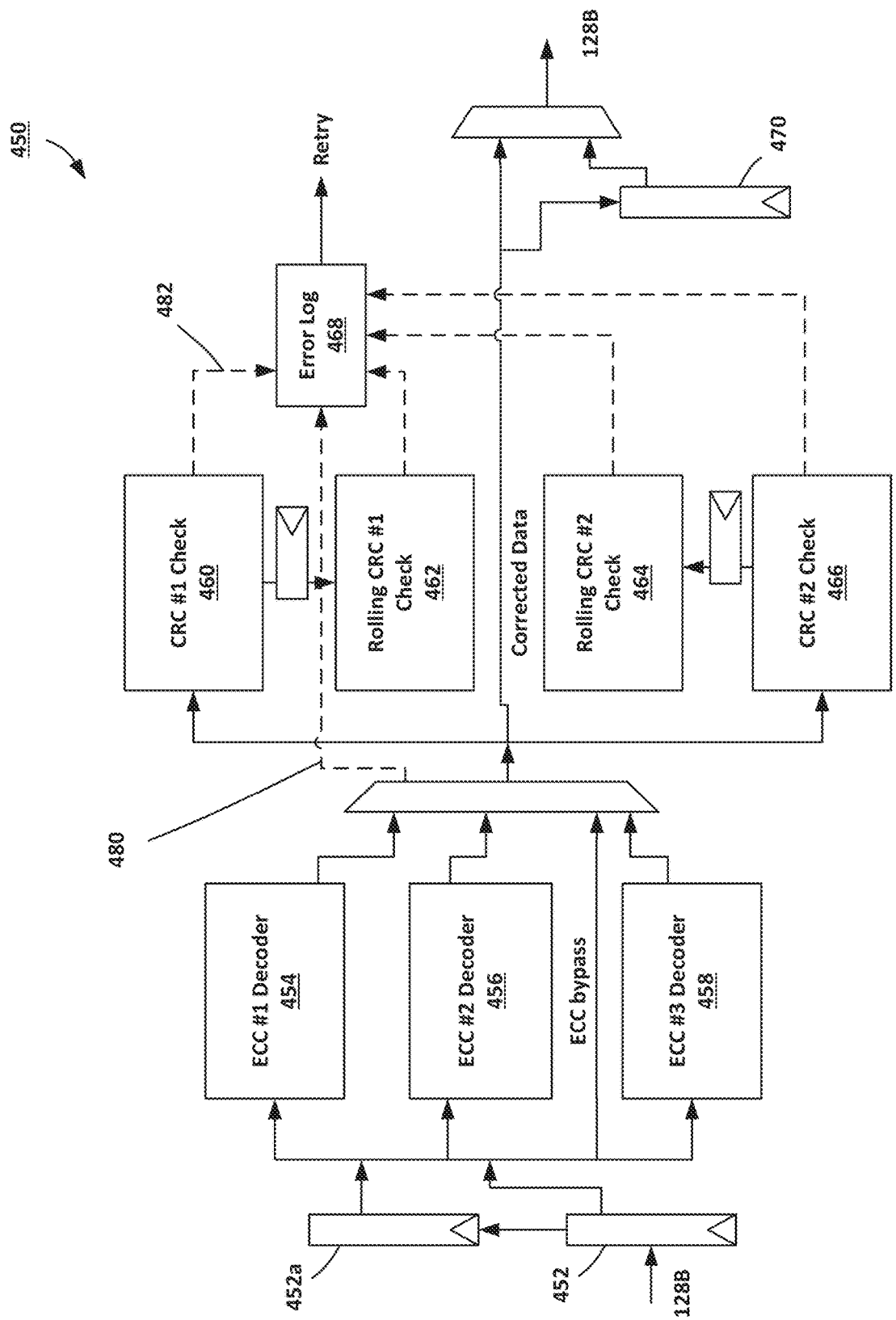
FIG. 4B is a schematic diagram of a receiver-side logical sub-block of a common PHY in accordance with embodiments of the present disclosure.

FIG. 4B is a schematic diagram of a receiver-side logical sub-block 450 of a common PHY in accordance with embodiments of the present disclosure. FIG. 4B demonstrates the receiver side logical sub-block 450, corresponding to the transmitter side logical sub-block 400, described above. Since the receiver-side logical sub-block 450 needs to correct errors and detect any errors that could not be corrected, the receiver-side logical sub-block 450 includes a mechanism to log the errors (error log 518) and invoke a link level retry with its Link partner as needed.

The example receiver-side logical sub-block 450 includes three FEC decoders: ECC #1 decoder 454 corresponding to ECC #1 encoder 414, ECC #2 456 corresponding to ECC #2 encoder 416, and ECC #3 458 corresponding to ECC #3 encoder 416. The ECC decoders can correct for errors. In embodiments, certain errors can be reported to the error log 468 for retry, such as error 480.

The example receiver-side logical sub-block 450 includes four CRC decoders, such as CRC #1 check decoder 460 corresponding to CRC #1 encoder 404, rolling CRC #1 check decoder 462 corresponding to rolling CRC #1 encoder 406, CRC #2 check decoder 466 corresponding to CRC #1 encoder 410, and rolling CRC #2 decoder 464 corresponding to rolling CRC #2 encoder 408. The CRC decoders can determine uncorrectable errors (e.g., error 482), and report the uncorrectable errors to the error log 468 for retry.

Flit sizes are similarly addressed using buffers 452, 452a, and 470.

Figure 5A:
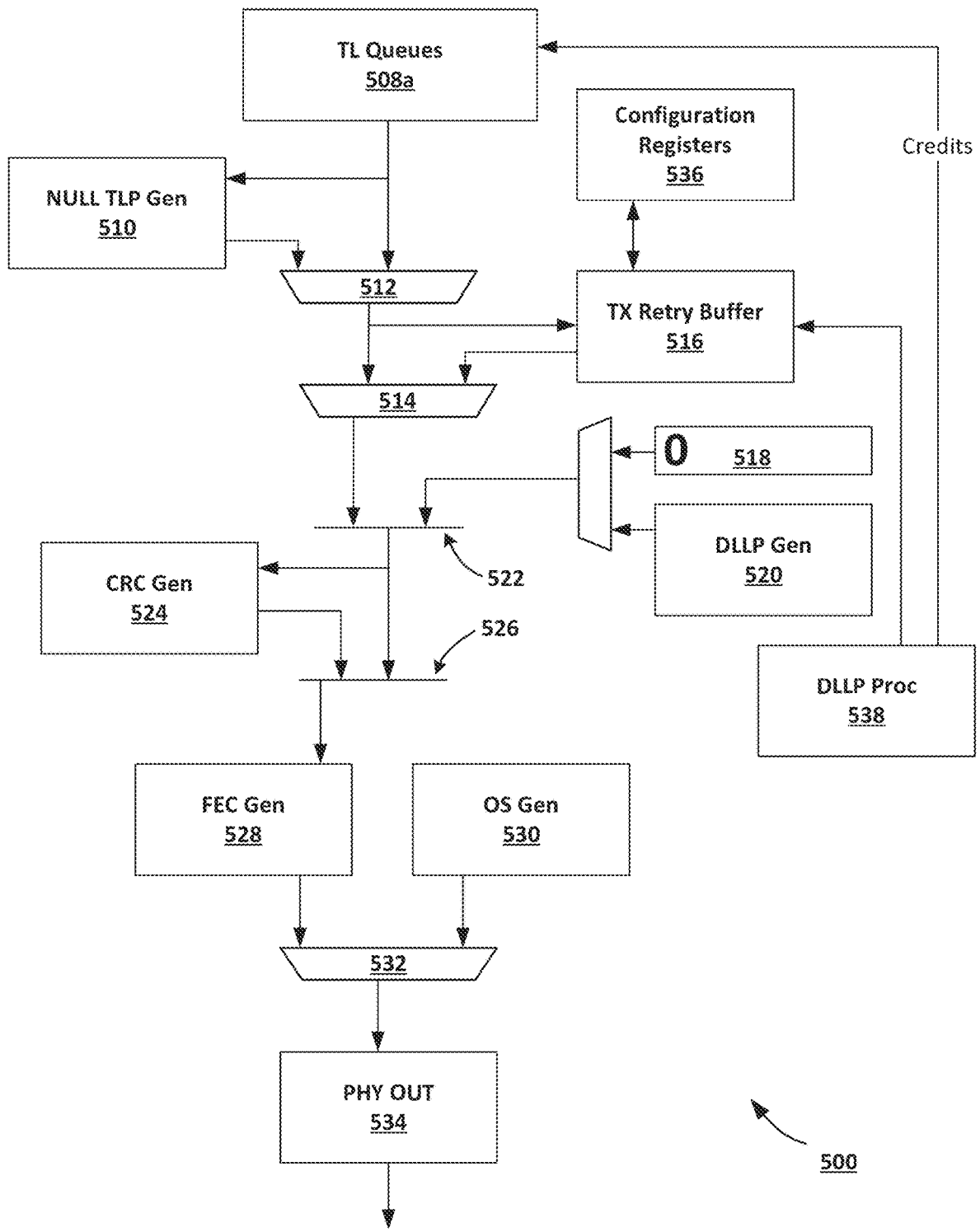
FIGS. 5A-B are schematic diagrams illustrating example circuitry and logic within a protocol stack including error logging mechanisms in accordance with embodiments of the present disclosure.
Figure 5B:
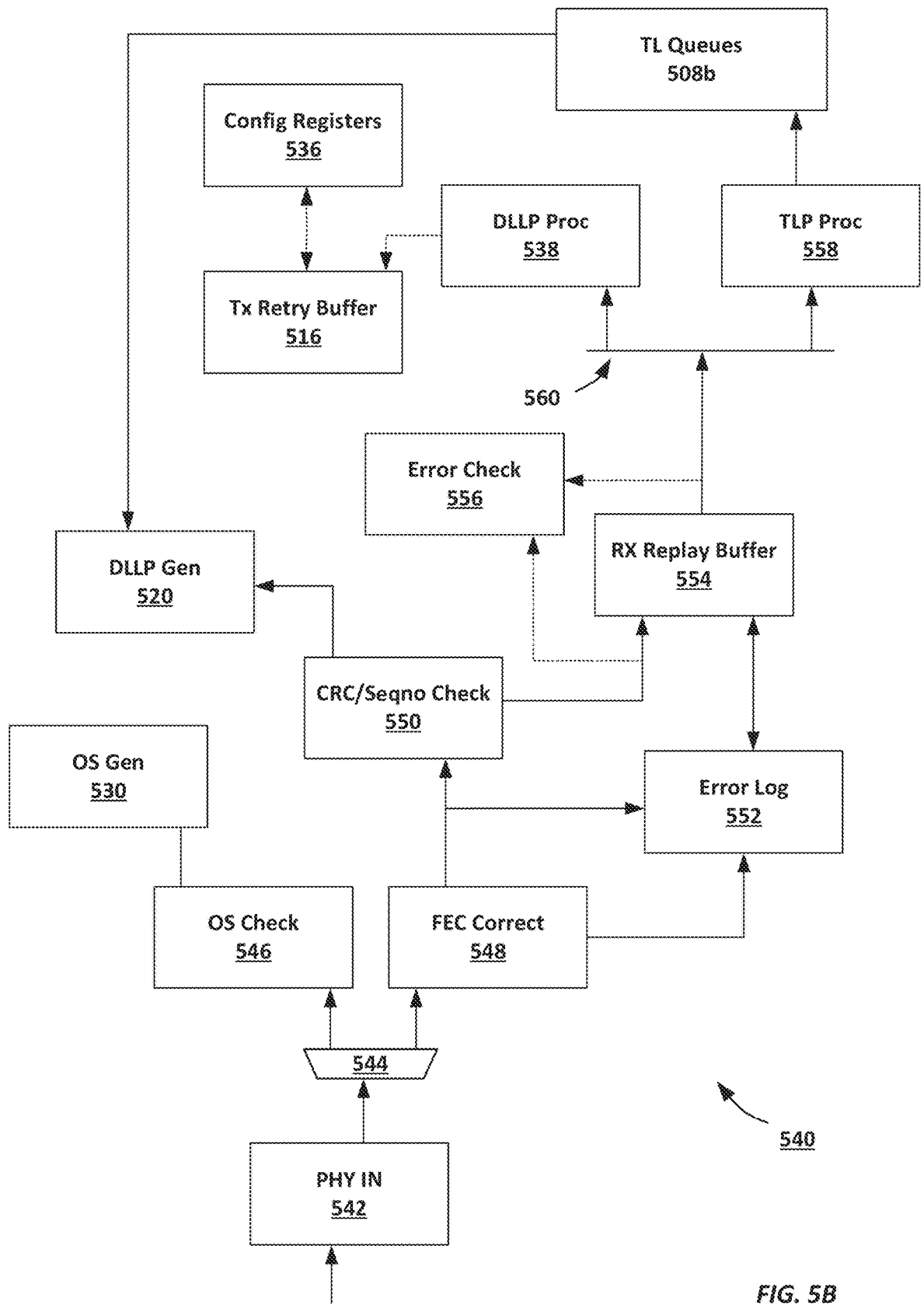

FIGS. 5A-B are schematic diagrams illustrating example circuitry and logic within a protocol stack including error logging mechanisms in accordance with embodiments of the present disclosure. FIGS. 5A-B demonstrate an example micro-architecture implementing the physical, link, and transaction layers of serial interconnects such as PCIe/CXL/UPI. The disclosure describes multiple detection and logging mechanisms, as shown in FIGS. 5A-B.

FIG. 5A illustrates a logic circuitry of a protocol stack 500 of a transmitter side of the microarchitecture. The protocol stack 500 can include transaction layer (TL) queues 508a, a No Operation transaction layer packet (NOP TLP) generator 510, and a TX retry buffer 516. The TL queues 508a can include logic to store or buffer outbound transaction layer information, payload data, control data, etc. for an outbound packet. The NOP TLP generator 510 can generate NOP TLPs that can be included in a NOP flit that is transmitted by the transmitter across the link. A NOP flit can be considered a flit that does not contain transaction layer packet or data link layer packet information. In some instances, the NOP flit can include NOP symbols indicating an absence of TL and DLLP payload. In some instances, a NOP flit can be transmitted for the receiver to use to check errors and increase the likelihood of retried packets being corrected. Information from TL queues 508a can be muxed with information from the NOP TLP Gen 510 by mux 512.

The TX retry buffer 516 can be used to temporarily store packets for retransmission if an error occurred during a previous transaction. A portion of the TX retry buffer 516 can be repurposed for storing error information in some implementations, such as those without available configuration register space. The DLLP processor 538 (on the receiver side protocol stack 540) can provide an ACK/NACK response to the retry buffer 516 to either cause the TLP in the retry buffer 516 to resend or to clear. The DLLP processor 538 can use information about errors in a flit to cause a new flit to be transmitted across the link.

The protocol stack 500 can include a data link layer packet (DLLP) generator 520 for generating DLLP information for the packet. The DLLP information can be augmented to a TLP by a mux/merge 522. The output of the TX retry buffer can be muxed with the output of mux 512 by a mux 514. The output of mux 514 can be mux/merged with either all zeros 518, which can be used for error checking as described later, or with the product of the DLLP generator 520.

The protocol stack 540 can also include a cyclic redundancy check (CRC) code generator 524 that can generate CRC for the outbound flit. The CRC code can be mux/merged 526 with the outbound flit. A forward error correction (FEC) generator 528 can add error correcting code (ECC) as described above. ECC can be interleaved across each lane of the flit using three groups of ECC.

An ordered set (OS) generator 530 can provide ordered sets as flit payload. For example, the OS generator 530 can provide SKiP (SKP) OS into the flit stream. SKP OS can be used to indicate that a next flit is an all-zero flit, as described more below.

The flits can be transmitted out of the PHY output 534, which can include an analog front end (AFE), scrambling operations, serialization, etc.

FIG. 5B illustrates a logic circuitry of a protocol stack 540 of a receiver side of the microarchitecture. A flit can be received by a receiver port's PHY input 542. The PHY input 542 can include an AFE, descrambling operations, and other operations found in the PHY input. The flit can be demuxed by demux 544 for being an OS flit by OS check 546 or a payload flit. The payload flit can undergo error detection by FEC logic 548 that uses the ECC to identify and correct errors within the flit. The outcome of error detection can be logged in error log 552, as described in more detail below. The flit can also undergo CRC checks by CRC logic 550. The CRC logic 550 can detect errors at log errors as described below using functions found in error check logic 556. The error check logic 556 can also use stored information in the RX replay buffer 554 to identify bit locations of uncorrectable errors. The flit is split by demerge 560, and an ACK/NACK is provided to TX retry buffer 516 by the DLLP processor 538. The TLP processor 558 can send the payload to the transaction layer queues 508b.

This disclosure describes error logging for correctable and uncorrectable errors detected by the various error detection mechanisms described above (e.g., FEC, CRC, error check logic, etc.). Errors are entered into the (FEC) error log 552 only if the flit is deemed correctable through each of the ECC groups, and if necessary, as well as the CRC check. This is to avoid the case where an ECC aliased to correcting a symbol that is not in error or an ECC corrected the error incorrectly in an erroneous Symbol. The error log for the interleaved FECs as well as the CRC level detection can be represented as a data structure similar to that shown in Table 1. Since there are three interleaved ECCs as part of the FEC in each flit, the error log for each ECC group is recorded, as shown in Table 1. Those skilled in the art would recognize that the number of ECC groups will scale according to the type of FEC used. When a flit gets corrected, each ECC group records if it corrected an error along with the Symbol number as well as the error magnitude in the Symbol that was corrected.

quent flits the FEC recorded. In addition to logging the first error, this error log also logs for correctable and uncorrectable errors in the next four flits to indicate the length of the burst.

It should be noted that the above mechanism can be extended by another set of registers to log the exact error patterns for correctable errors in subsequent flits by replicating the register bits in Table 1 (bits 2:0 and bits 55:8), as shown in Table 2. If a device implements additional FEC log registers in Table 2, it can use an existing structure such as the retry buffer or replay buffer, as shown in FIG. 5B, taking advantage of the fact that these buffers are not written every cycle or by overprovisioning the write and read bandwidth of these structures. The additional entries can be read through a control register (fec_error_log_offset ([7:0]), which can be Reserved if a device does not implement the extra registers in Table 2). Software can write the register

TABLE 1

FEC Error Log for error correction of the first flit in error.

| Bit No | Field/Description | Comments |
| --- | --- | --- |
| 2:0 | ECC Group 0/1/2 corrected error and no uncorrectable error detected in the flit | All 3 ECC groups in same flit. Set only if the ECC group corrected a Symbol error, when set to 1b. A Write of 1 to bit 0 will clear all the 64 bits |
| 7:3 | Subsequent flits had an error (5 flits from the flit that first corrected an error), either correctable or uncorrectable | Only valid if at least one of the bits 2:0 is 1b. This will log correctable errors only if there are no extra FEC error logs available in the device |
| 15:8 | ECC Group 0 Symbol No corrected | Symbol number that was corrected in ECC Grp 0 |
| 23:16 | ECC Group 0 magnitude of error correction | Amount of error correction within the Symbol |
| 31:24 | ECC Group 1 Symbol No corrected | Symbol number that was corrected in ECC Grp 1 |
| 39:32 | ECC Group 1 magnitude of error correction | Amount of error correction within the Symbol |
| 47:40 | ECC Group 2 Symbol No corrected | Symbol number that was corrected in ECC Grp 2 |
| 55:48 | ECC Group 2 magnitude of error correction | Amount of error correction within the Symbol |
| 62:56 | Number of subsequent flits FEC recorded | This will be 00h when the first error is recorded |
| 63 | Number of subsequent flits FEC recorded reached the capacity of the device when 1b | This will be set to 1b for devices that only implement one register when any of the bits [2:0] are set to 1b |

As can be seen from Table 1, each ECC group is represented in the table as having corrected an error in the first flit. Information can also be included to indicate that no uncorrectable errors were found in the first flit. The FEC error log can also include information about the number of subsewith the offset after reading the number of error logs from the first entry (fec_error_log_offset=00h—the one in Table 1) and then sequentially read each element of Table 2. Software can then clear all the error logs by writing a 1b to bit 0 of the register in Table 1.

TABLE 2

FEC Error Log for the error correction of the subsequent flits in error.

| Bit No | Field/Description | Comments |
| --- | --- | --- |
| 2:0 | ECC Group 0/1/2 corrected error and no uncorrectable error detected in the flit | All 3 ECC groups in same flit. Set only if the ECC group corrected a Symbol error, when set to 1b. A Write of 1 to any of these bits will clear all the 64 bits |
| 7:3 | Subsequent flits have an uncorrectable error (5 flits from the flit that first corrected an error), and no correctable errors before the flit with an uncorrectable error | If flit 1 has an uncorrectable error, flit 2 has a correctable error, and flit 3, 4, 5 have uncorrectable error, this field will be 00001b. The expectation is flit 2 will create its own FEC error log where flits 3, 4, and 5 status will be recorded |
| 15:8 | ECC Group 0 Symbol No corrected | Symbol number that was corrected in ECC Grp 0 |
| 23:16 | ECC Group 0 magnitude of error correction | Amount of error correction within the Symbol |

TABLE 2-continued

FEC Error Log for the error correction of the subsequent flits in error.

| Bit No | Field/Description | Comments |
|---|---|---|
| 31:24 | ECC Group 1 Symbol No corrected | Symbol number that was corrected in ECC Grp 1 |
| 39:32 | ECC Group 1 magnitude of error correction | Amount of error correction within the Symbol |
| 47:40 | ECC Group 2 Symbol No corrected | Symbol number that was corrected in ECC Grp 2 |
| 55:48 | ECC Group 2 magnitude of error correction | Amount of error correction within the Symbol |
| 63:56 | Flit Offset from the prior flit where the correctable error was recorded | An FFh indicates the distance from the previous flit recoding a correctable error is greater than or equal to 255 |

The mechanisms described above will record the exact error pattern within a flit if it is correctable. In some instances, the FEC and/or CRC can detect an uncorrectable error. Uncorrectable errors can be logged in an Uncorrectable Error Log, as shown in Table 3.

TABLE 3

Uncorrectable Error Log.

| Bit No | Field/Description | Comments |
|---|---|---|
| 0 | First flit error detection when set to 1b | This can be set either by the CRC logic or by the error detection of FEC |
| 7:1 | Error in any of the Subsequent 7 flits after the first flit in error had uncorrectable errors | Only set for the 7 subsequent flits after the first flit in error - uncorrectable |
| 14:8 | Error in any of the Subsequent 7 flits after the first flit in error had correctable errors | Only set for the 7 subsequent flits after the first flit in error - correctable |
| 15 | Error in any flit in flits 8-15 after the first flit with uncorrectable error | Works as an overflow indicator |

The uncorrectable error log in Table 3 logs the first flit that had an uncorrectable error, detected either by an ECC group and/or the CRC logic. The uncorrectable error log also logs the type of error (no error, correctable error, or uncorrectable error) in the next 7 flits and a bit to log if at least one flit in the next 8 flits (flit 8-15 from the first flit which has been logged as having an uncorrectable error) to indicate the extent of the burst. It should be noted that in this disclosure, uncorrectable, indicates errors that could not be corrected by FEC but detected (even though it will be corrected with link layer retry).

In addition to the error logs shown in Tables 1-3, register entries can be defined. For example, a register referred to as num_flits_err[15:0] can include information to indicate the number of flits in error (correctable and uncorrectable). Another register referred to as tot_flits_rcvd[31:0] can indicate the number of flits received. These registers do not roll over once they hit the maximum value (all Fs) and are reset to 0 when software writes to the num_flits_err register. Other control registers that can be defined include:

FEC_error_log_offset[7:0] (or flit_offset_FEC), which can include further information about additional error log entries, such as a flit offset from a prior flit where the correctable error was recorded;

flit_num_uncorr, which can include information identifying a number of flits received with an uncorrectable error or a number of flits with an uncorrectable error offset from a first flit with an uncorrectable error;

flit_num_corr, which can include information identifying a number of flits received with a correctable error, or a number of flits with an correctable error offset from a first flit with a correctable error.

These registers can be part of the configuration register space. In some embodiments, register values can be stored in, e.g., a portion of the TX retry buffer or other memory location.

If a device implements additional FEC log registers in Table 2, the device can use an existing structure such as the retry buffer or replay buffer, as shown in FIGS. 5A-B, taking advantage of the fact that these buffers are not written every cycle or by overprovisioning the write and read bandwidth of these structures. The additional entries can be read through a control register (fec_error_log_offset[7:0], which can be reserved if a device does not implement the extra registers in Table 2). Software can write the register with the offset after reading the number of error logs from the first entry (fec_error_log_offset=00h—the one in Table 1) and then sequentially read each element of Table 2. Software can clear all the error logs by writing a 1b to bit 0 of the register in Table 1.

Figure 6A:
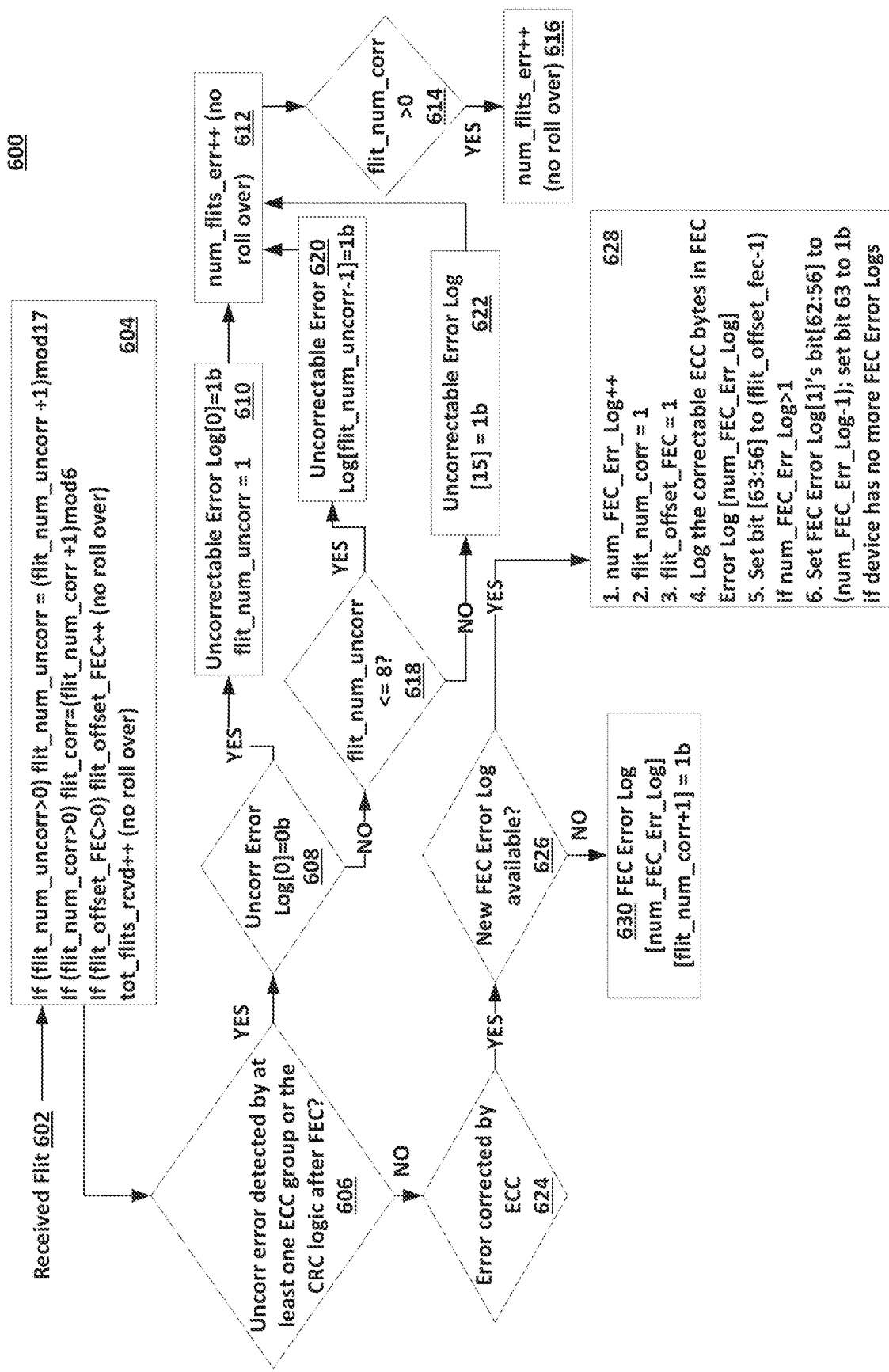
FIGS. 6A-B are process flow diagrams for error logging for correctable and uncorrectable errors with error locations in accordance with embodiments of the present disclosure.
Figure 6B:
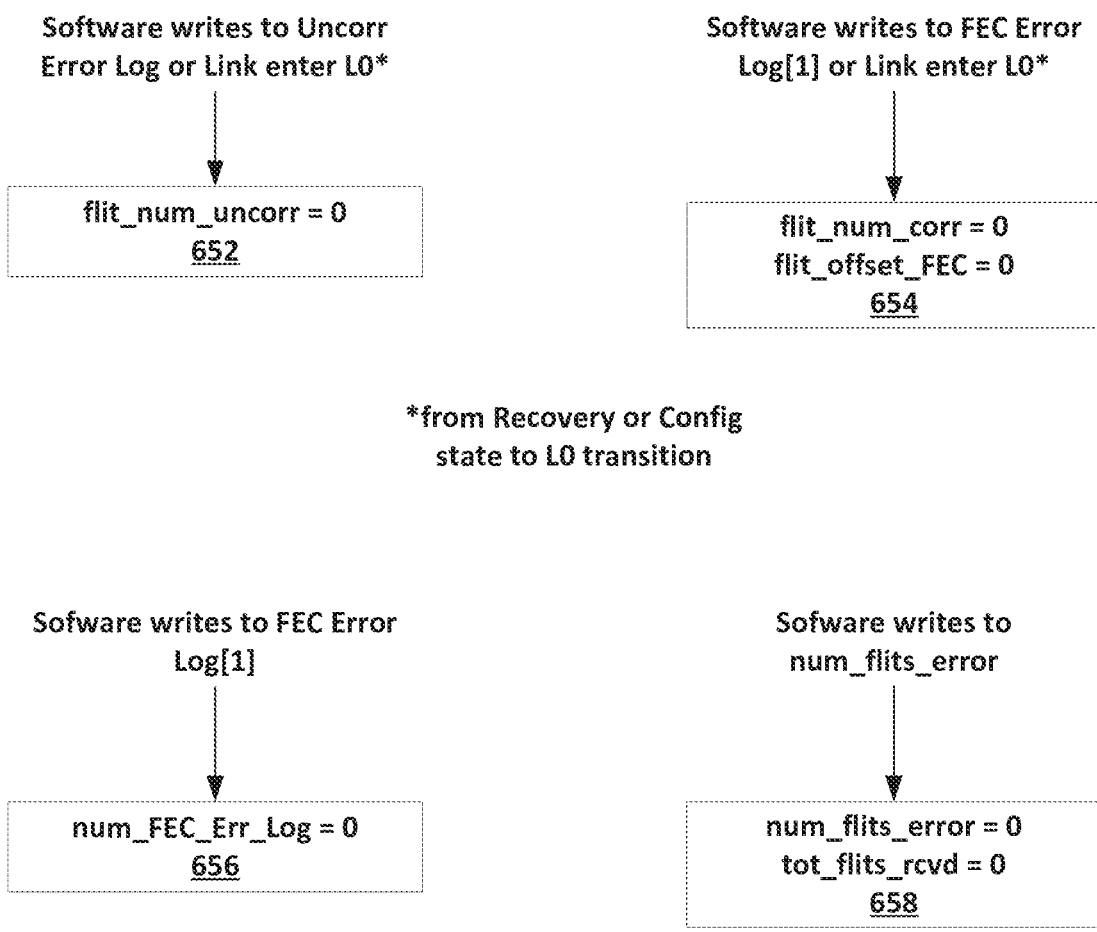

FIGS. 6A-B are process flow diagrams for operation of registers for error logging for correctable and uncorrectable errors with error locations in accordance with embodiments of the present disclosure.

FIG. 6A is a process flow diagram 600 illustrating register value sets for various error conditions in accordance with embodiments of the present disclosure. At a receiver, a flit can be received (602). The flit can be a first flit in a series of flits, or the flit can be a subsequent flit following one or more prior flits. The various registers tracking the number of flits and the total flits received can be incremented (604). Assuming the value initialization described in FIG. 6B, for example:

If (flit_num_uncorr>0) flit_num_uncorr=(flit_num_uncorr+1)mod 17;

If (flit_num_corr>0) flit_num_corr=(flit_num_corr+1) mod 6;

If (flit_offset_FEC>0) flit_offset_FEC++ (no rollover); tot_flits_rcvd++(no rollover).

An error can be detected in the flit using, e.g., FEC or CRC. The determination of whether an error occurs in the flit and whether the error is correctable or uncorrectable is discussed elsewhere in this disclosure. If either the FEC using ECC or the CRC detects an uncorrectable error (606), it can be determined if the flit is a first flit or not a first flit by checking the 0 bit of the uncorrectable error log (e.g., if [0]=1b, then the flit is not a first flit to contain an error; if [0]=0b, the flit is a first flit to contain an error) (608). If the flit is a first flit (e.g., [0]=0b), then the [0] can be set to 1b and the flit_num_uncorr can be set to 1 (610). The total number of flits that have an error register value (num_flits_err) can be incremented (num_flits_err++) (612). In some instances, the flit can also include a correctable error. If in step 602, flit_num_corr>0, then the num_flits_err can be incremented (616).

If the flit is not a first flit with an uncorrectable error (e.g., [0]=1b), it can be determined whether the flit is within the first 7 flits (flit_num_uncorr<=8=yes) (618), then the uncorrectable error log bit is set to 1 for the previous bit location in the log (Uncorrectable Error Log[flit_num_uncorr-1]= 1b) (620). The total number of flits that have an error register value (num_flits_err) can be incremented (num_flits_err++) (612). In some instances, the flit can also include a correctable error. If in step 602, flit_num_corr>0, then the num_flits_err can be incremented (616).

If the flit is flit 8-15 from the first flit, then Uncorrectable Error Log[15] is set to 1b (622). The total number of flits that have an error register value (num_flits_err) can be incremented (num_flits_err++) (612). In some instances, the flit can also include a correctable error. If in step 602, flit_num_corr>0, then the num_flits_err can be incremented (616).

If an uncorrectable error is not detected in the flit, but a correctable error was detected (624). If a new FEC error log (correctable) is available (626), then the following can occur (628):

1. num_FEC_Err_Log++
2. flit_num_corr=1
3. flit_offset_FEC=1
4. Log the correctable ECC bytes in FEC Error Log [num_FEC_Err_Log]
5. Set bit [63:56] to (flit_offset_fec-1) if num_FEC_Err_Log>1
6. Set FEC Error Log[1]'s bit[62:56] to (num_FEC_Err_Log-1); set bit 63 to 1b if device has no more FEC Error Logs.

If a new FEC error log (correctable) is not available, then a populated error log can be cleared: [num_FEC_Err_Log] [flit_num_corr+1]=1b.

FIG. 6B is a diagram 650 illustrating initialization of certain values in accordance with embodiments of the present disclosure. If software writes to the Uncorrectable Error Log or the link enters L0 from recovery or from a configuration state to L0 transition:
flit_num_uncorr=0 (652).

If software writes to the FEC Error Log (correctable)[1] or link enters L0 from recovery or from a configuration state to L0 transition:
flit_num_corr=0;
flit_offset_FEC=0 (654).

If software writes to the FEC Error Log (correctable)[1]:
num_FEC_Err_Log=0 (656).

If software writes to num_flits_err:
num_flits_err=0;
tot_flits_rcvd=0 (658).

The above mechanisms will detect correlated errors occurring within a window of the first flit in error, whether correctable or uncorrectable. The window can be, for example, the first 15 flits after the first flit. For correctable errors, the exact error pattern can be determined even across multiple flits if multiple FEC error log registers are deployed.

In some embodiments, a retried flit that is received without error can be compared against the erroneous flit that is stored in the Rx replay buffer. If a good flit indicates that the prior flit with an undetected error was a NOP flit, then all the non-0 bit positions in the first 236 Bytes (for TLP) of the prior flit must be in error, which can be registered.

In some embodiments, an all zero flit can be transmitted (and received). All 0s in all flits (prior to scrambling) can be transmitted and received with the help of software and the use of ordered sets, such as SKiP Ordered Sets (SKP OS). Software initiates this testing by writing to the existing margin command register in PCIe/CXL and the corresponding SKP OS are used to convey the intent of all 0s in the flits to the Retimer(s) as well as to the Link Partner that can. Those skilled in the art will recognize that these mechanisms can be easily extended to other interconnects. In this mechanism, each Rx is informed to expect only 0s (after descrambling) in the flits. Thus, each Receiver can compare the bits it receives in the all 0 flit with 0s and can logs the errors for the bits that are non-0. It then stores the mismatched bits in the register defined in Table 5 below. Even Retimers can implement this register which can be read either through the in-band control SKP OS mechanism or through a sideband mechanism.

Figure 7:
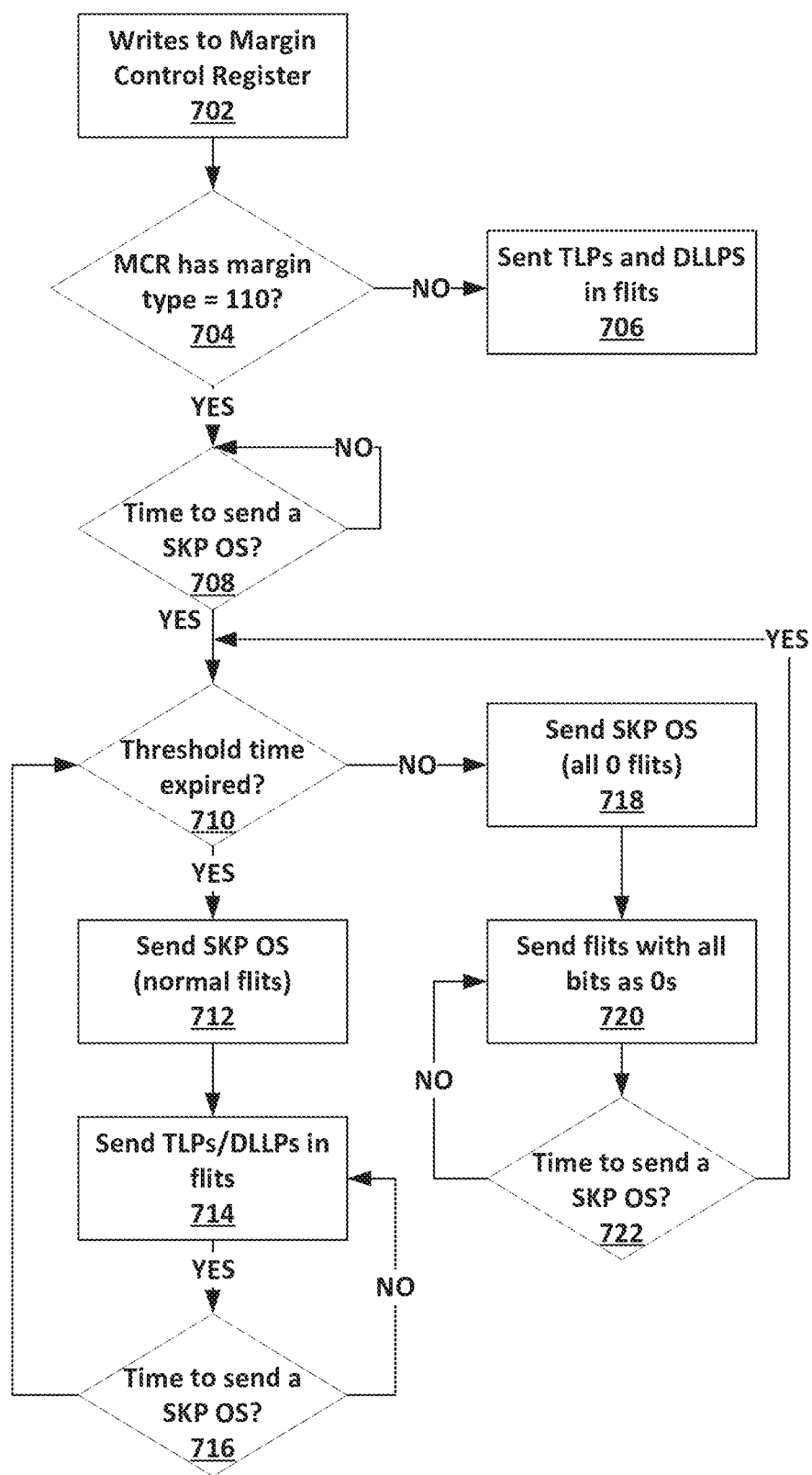
FIG. 7 is a process flow diagram for a transmitter port to schedule all zero flits in accordance with embodiments of the present disclosure.

FIG. 7 is a process flow diagram for a transmitter port to schedule all zero flits in accordance with embodiments of the present disclosure. FIG. 7 demonstrates how the all-0 flits get scheduled following software writing to the Margin Control register. This mechanism sends a SKP OS indicating that all-0 flits will be sent till the next SKP OS. The Port will only send scheduled TLPs/DLLPs after waiting for the mandated time provided in the Margin Control register (Table 4). This enables traffic to flow while sending as many all-0 flits as possible for diagnostic purposes.

TABLE 4

Enhanced Margin Command Related Fields in the Control SKP OS for detecting and logging correlated errors by sending 0s in flits and the control register at the port for initiating this test mode.

| Symbol | Description where the 'Usage Model' is 'Lane Margining at Receiver' |
| --- | --- |
| 4*N + 2 | Bit 6: Usage Model = 0b<br>(0b: Lane Margining at Receiver, 1b: Reserved)<br>[Software writes a 0b to this bit to get the test mechanism started]<br>Bits [5:3]: Margin Type = 110b (Correlated error detection)<br>[Software writes 110b to this field to get the test mechanism started] |

TABLE 4-continued

Enhanced Margin Command Related Fields in the Control SKP OS for detecting and logging correlated errors by sending 0s in flits and the control register at the port for initiating this test mode.

| Symbol | Description where the 'Usage Model' is 'Lane Margining at Receiver' |
|---|---|
|  | When 'Margin Type'= 110b:<br>Bit [2]: Transmitter will send all 0s in the flits from next Data Block onwards when 1b; else it will send Data Blocks as normal<br>Bit [1]: Retimer(s) have error to report which will be reflected in 4N + 3<br>Bit[0]: Port received the Bit{2] set to 1b in its Receiver and is collecting error statistics<br>[These 3 bits in the control register will be set to 100b by software if it initiates the 'Correlated error detection' in Margin Type field] |
| 4*N + 3 | Bits [7:0]: Margin Payload (used by Retimer when in 'Correlated error detection mode' if the other direction is transmitting all 0s in flits)<br>The Port sets this field to 00h. The first Retimer takes precedence in reporting its error, the second Retimer updates this field if this field is still all 0s. The second Retimer sets Bit[7] = 1b if it sets this field whereas the first Retimer sets it to 0b.<br>Bits[6:0] = {Flit number of the first flit in error (i.e., non-0 bit) in the other direction} >> x (where x = 3 if SKP insertion interval >511, x = 2 if SKP insertion interval >255, x = 1 if SKP insertion interval >127, x = otherwise)<br>[The above represents the most-significant bits if the SKP insertion interval is larger than the 7 bits allotted. The SKP insertion interval is pre-determined depending on SRIS vs non-SRIS (SRNS or common) clocking mode, the data rate, and the width of the Link.]<br>For the Control Register: this field indicates the number of micro-seconds the Port should hold off on transaction(s) and ten times the number of micro-seconds the Port should hold off on scheduled DLLP(s) before scheduling them to start on the next flit after the SKP OS (which should indicate that the 0s in flits will not be sent). |

The following register(s) defines the error log that can be used to store non-0 bit positions in an error log. A device is required to have at least one log but can implement more than one. The num_err_log_all0_flits register has the number of error logs that the device has registered information. A device can choose to change the number of these registers available over time. Further, a device is permitted to overwrite prior entries, as long as there is at least one Lane that covers the correlated error in a different Lane. For example, if a device has two error logs and correlated errors occur in multiple Lanes overlap, the error logs include 2 of those Lanes. However, at a later time, outside the window of coverage of the first error sequence, if a second error sequence is detected, the second entry can be used to store the second sequence. The information associated with the first sequence is not completely lost since the first Log will point to that Lane as also having an error. In this case, logging a new sequence is prioritized over the more elaborate log associated with the second Lane in the first sequence. Software can write to num_err_log_all0_flits register to clear that register as well as all the 'Burst Error Log' registers.

In FIG. 7, at the outset, a write to the margin control register can initiate the testing (702). For example, software writes a 0b to bit 6 and a margin type value of 110b to get the test mechanism started. Without the margin type set to 110b (704), the TLPs and DLLPs are sent in the flits normally (706). With the margin type set to 110b, and it is time to send a SKP OS (708), then it can be determined whether a threshold time for sending a TLP or DLLP has expired (710). For example, if a TLP has been waiting to be sent for longer than "Margin Payload" microseconds, as read from the margin command register or a DLLP is waiting longer than 10× "Margin Paylod" microseconds, then a SKP OS can be sent indicating that normal flits will follow (e.g., Margin Type=No command) (712). The SKP OS can be followed by the TLP and/or DLLP that is waiting to be sent (714). Once it becomes time to send a SKP OS again (716), the threshold time expiration determination can be made again (710).

If a threshold time for sending TLP and/or DLLP has not expired (710), then the SKP OS is sent that indicates the following flit(s) will be all 0 flits (718). The SKP OS can be followed by all 0 flits (720) until it is time to send another SKP OS (722).

Tables 5 is a burst Error log to capture the flit number & bit numbers in error to help study the correlation.

TABLE 5

Burst Error Log (for all-0 flits and NOP flits) in a port.

| Bit No | Filed/Description |
|---|---|
| 0 | Valid - Indicates this register stores a valid error sequence |
| 4:1 | Lane No in error |
| 14:5 | Flit number offset from the last error registered in the prior error sequence in any Lane<br>[if this is this is the first error sequence then it indicates the flit offset since the all-0 flit has started, with no roll-over; if the error is in the same flit as the prior one then this is all 0; all 1's indicates >=1023 flits apart from the last error in the prior sequence) |

TABLE 5-continued

Burst Error Log (for all-0 flits and NOP flits) in a port.

| Bit No | Filed/Description |
|---|---|
| 26:15 | First bit in error within the flit in error |
| 37:27 | Last consecutive UI in error, offset from the first bit<br>[This tracks up to 2047 UI consecutive error] |
| 42:38 | Number of UIs with two bit flips between the First bit in error through the Last consecutive UI in error |
| 53:43 | Last bit in error, bit offset from the Last consecutive UI (bit) in error, within the 2047 bit window<br>[An error is considered to be in the same error sequence if the previous error in the Lane is less than a predetermined number of bits (e.g., 16) away] |
| 65:54 | Number of bits in error captured by this error sequence in this Lane No<br>[This field must be >0 if Valid = 1b and it does not roll over] |
| 81:66 | Lane Numbers in error during this error sequence (including the Lane number being reported) |
| 89:82 | First Retimer report out of error in the Lane Number where this is being recorded |
| 105:90 | Error reported in the corresponding Lane anytime during this recording in a Retimer |

Figure 8:
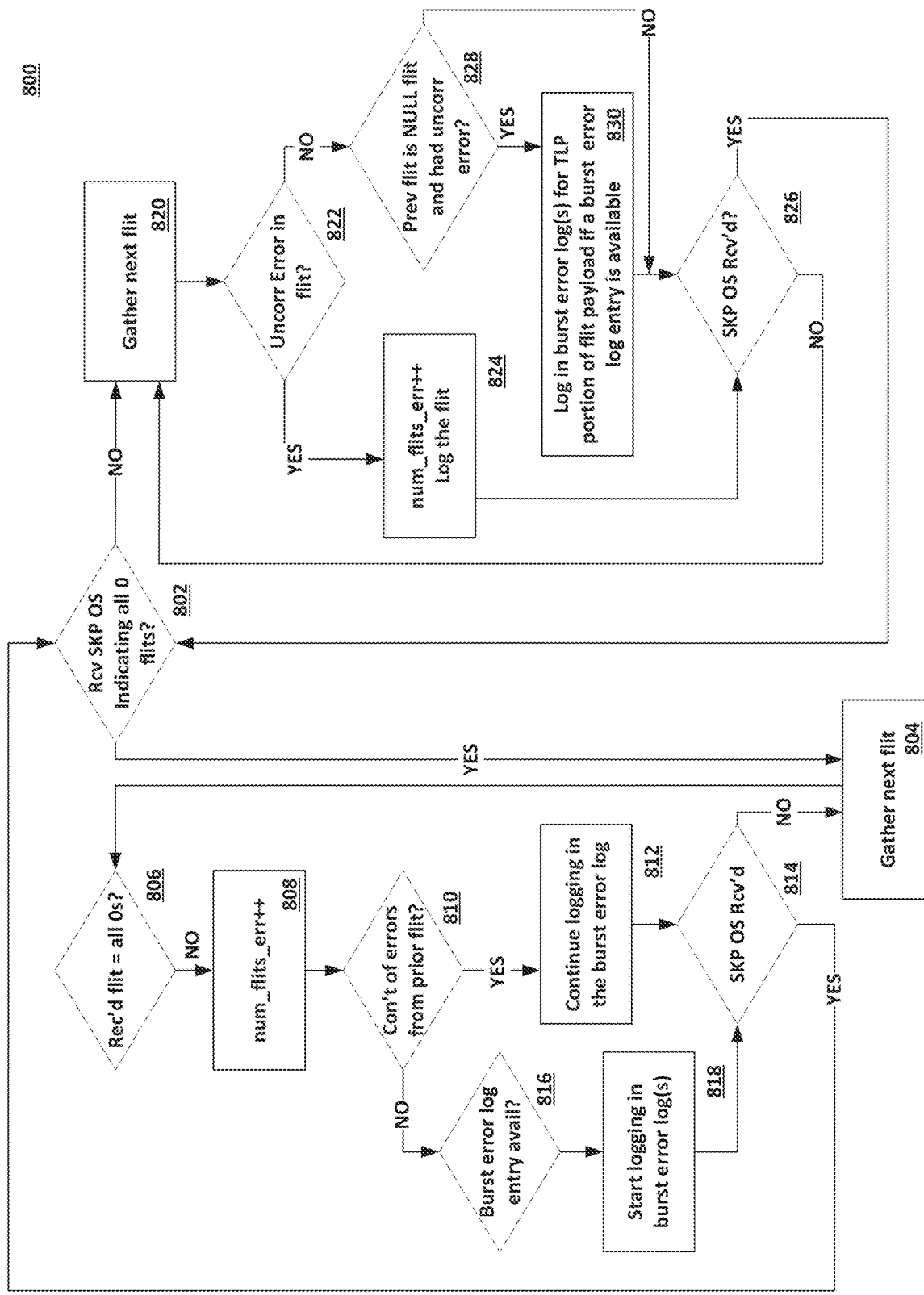
FIG. 8 is a process flow diagram for burst error logging in a receiver port in accordance with embodiments of the present disclosure.

FIG. 8 is a process flow diagram for burst error logging in a receiver port in accordance with embodiments of the present disclosure. FIG. 8 demonstrates how a Receiving Port deals with the all-0 flits as well as NOP flits and logs the error pattern in the Burst Error Log(s), including those reported by the Retimer(s).

At the outset, a port can receive a SKP OS (802). If the SKP OS indicates an all 0 flit is forthcoming, the port can gather the next flit (the all 0 flit) (804). If an all zero flit is received (806), then no error can be determined based on comparisons of the all 0 flit against a previous flit-in-error. If an all 0 flit is not received, then the error pattern can be identified by comparing the received flit against all zeros. The register value num_flits_err can be incremented (num_flits_err++) (808). If the error detection is a continuation of errors from a previous flit (810), then the receiver can continue logging in the burst error log (812) until a SKP OS is received (814). If the error detection is not a continuation of errors from a previous flit (i.e., it is a new error), then the receiver can start logging the burst error in the log(s) (818) if a burst error log entry is available (816). In embodiments, if a burst error log entry is not available, the system can enter recovery and clear the logs.

If the received SKP OS does not indicate an all 0 flit to follow (802), the receiver can gather the next flit (820). If there is an uncorrectable error in the flit (822), then the register num_flits_err can be incremented (num_flits_err++) and the flit can be logged in the uncorrectable error log (824). A next flit can be gathered (820) unless a SKP OS is received (826).

If the received flit at 820 does not have an uncorrectable error, it can be determined whether the previous flit is a NOP flit and had an uncorrectable error (828). If so, the error can be logged in the burst error log(s) for the TLP portion of the flit payload if a burst error log entry is available (830). If the previous flit is not a NOP flit with an uncorrectable error, the receiver can expect a SKP OS (826).

Figure 9:
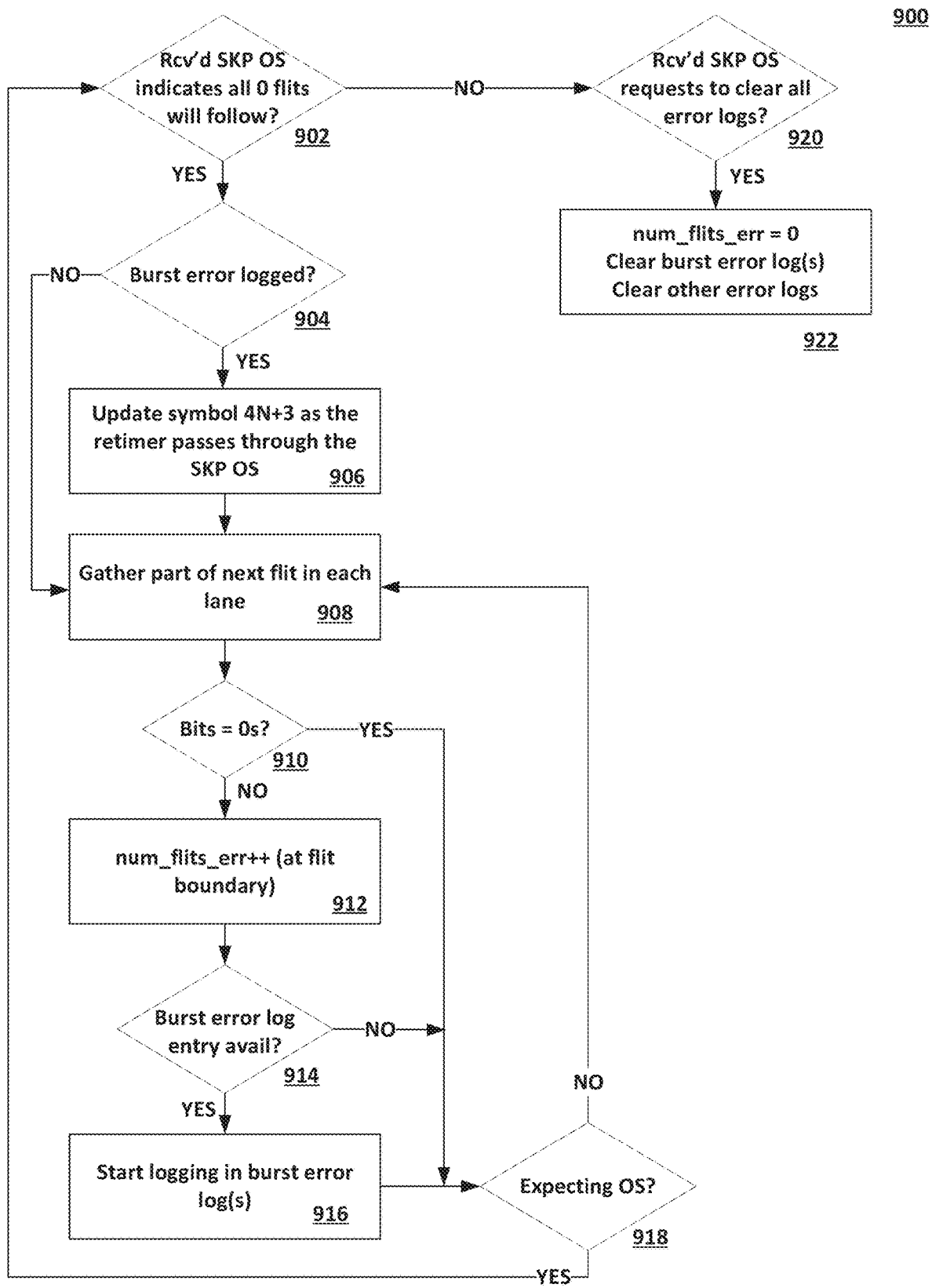
FIG. 9 is a process flow diagram for retimer behavior for passing through an all zero flit between a transmitter and a receiver in accordance with embodiments of the present disclosure.

FIG. 9 is a process flow diagram 900 for retimer behavior for passing through an all zero flit between a transmitter and a receiver in accordance with embodiments of the present disclosure. FIG. 9 shows how the Retimer operates when it receives all-0 flits and logs the errors in its Burst Error Log and also reports the errors in the SKP OS. The Burst Error Log for Retimer, as shown in Table 6, comprises of a subset of bits, since the Retimer operates on a per-Lane basis. Software can access this error log through the Margin control mechanism that already exists for CSR accesses or through a sideband access. It can also clear these error logs using the same existing mechanism.

TABLE 6

Burst Error Log (for all 0 flits) in a Pseudo Port of a Retimer.

| Bit No | Filed/Description |
|---|---|
| 0 | Valid - Indicates this register stores a valid error sequence |
| 14:5 | Flit number offset from the last error registered in the prior error sequence in any Lane<br>[iI this is this is the first error sequence then it indicates the flit offset since the all-0 flit has started, with no roll-over; if the error is in the same flit as the prior one then this is all 0; all 1's indicates >=1023 flits apart from the last error in the prior sequence) |
| 26:15 | First bit in error within the flit in error |
| 37:27 | Last consecutive UI in error, offset from the first bit<br>[This tracks up to 2047 UI consecutive error] |
| 42:38 | Number of UIs with two bit flips between the First bit in error through the Last consecutive UI in error |
| 51:43 | Last bit in error, bit offset from the Last consecutive UI (bit) in error, within the 511 bit window<br>[An error is considered to be in the same error sequence if the previous error in the Lane is less than a predetermined number of bits (e.g., 16) away] |

TABLE 6-continued

Burst Error Log (for all 0 flits) in a Pseudo Port of a Retimer.

Bit No  Filed/Description

63:52  Number of bits in error captured by this error sequence in this Lane No
[This field must be >0 if Valid = 1b and it does not roll over]

In FIG. 9, a retimer can receive a SKP OS (902). If the SKP OS does not indicate that an all 0 flit is to follow, the retimer can determine if the received SKP OS includes a request to clear all error logs (920). If so, the retimer can clear the error logs (num_flits_err=0; clear burst error log(s); clear other error logs). If not, then the retimer can pass-through the SKP OS.

If the retimer receives a SKP OS that indicates an all-0 flit is to follow (902), the retimer can determine if a burst error is logged (904). If a burst error is logged, then the retimer can update a symbol (e.g., 4N+3) in the margin command related fields in a control SKP OS as the retimer passes through the SKP OS (906). The retimer can gather the next flit in each lane (908). If the flit is an all 0 flit (910) the retimer can pass through the flit. If the retimer is not expecting a SKP OS (918), the retimer continues to gather flits (908). If the flit is not an all 0 flit (910), then the retimer can increment the error log register entry num_flits_err (num_flits_err++) at the flit boundary (912). If a burst error log entry is available (914), the retimer can start logging the error in the burst error log(s) (916). If no burst error log entry is available, then the retimer can either gather the next flit (908) or can receive a SKP OS (902).

The way that errors are logged, as described herein, provide specific lane and bit level information about the errors that are being detected. The host device can use that information to correlate errors to specific problems, either in the memory, the protocol stack, the link, or elsewhere. Using finer granularity error detection and error logging, errors received across a link can be correlated to specific causes, allowing for the host or receiver or intermediate component to identify those causes and correct them.

Figure 10:
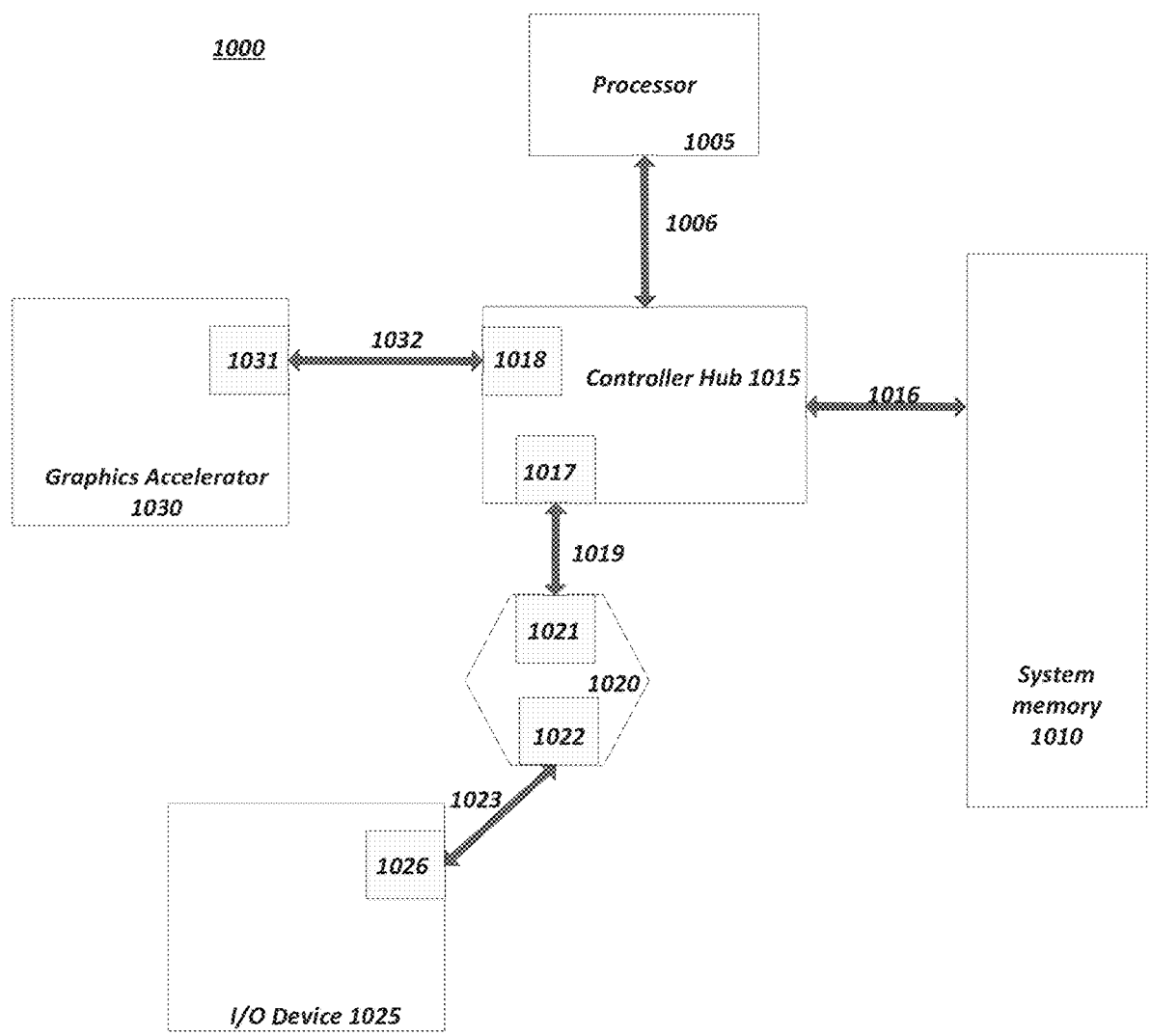
FIG. 10 illustrates an embodiment of a computing system including an interconnect architecture.

Referring to FIG. 10, an embodiment of a fabric composed of point-to-point Links that interconnect a set of components is illustrated. System 1000 includes processor 1005 and system memory 1010 coupled to controller hub 1015. Processor 1005 includes any processing element, such as a microprocessor, a host processor, an embedded processor, a co-processor, or other processor. Processor 1005 is coupled to controller hub 1015 through front-side bus (FSB) 1006. In one embodiment, FSB 1006 is a serial point-to-point interconnect as described below. In another embodiment, link 1006 includes a serial, differential interconnect architecture that is compliant with different interconnect standard.

System memory 1010 includes any memory device, such as random access memory (RAM), non-volatile (NV) memory, or other memory accessible by devices in system 1000. System memory 1010 is coupled to controller hub 1015 through memory interface 1016. Examples of a memory interface include a double-data rate (DDR) memory interface, a dual-channel DDR memory interface, and a dynamic RAM (DRAM) memory interface.

In one embodiment, controller hub 1015 is a root hub, root complex, or root controller in a Peripheral Component Interconnect Express (PCIe or PCIE) interconnection hierarchy. Examples of controller hub 1015 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015.

Here, controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, i.e. up a hierarchy towards a root complex, to controller hub 1015 and downstream, i.e. down a hierarchy away from a root port controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1025 may include a PCIe to PCI/PCI-X bridge to support legacy or other version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly I/O device 1025, is then coupled to the ICH. I/O modules 1031 and 1018 are also to implement a layered protocol stack to communicate between graphics accelerator 1030 and controller hub 1015. Similar to the MCH discussion above, a graphics controller or the graphics accelerator 1030 itself may be integrated in processor 1005.

Figure 11:
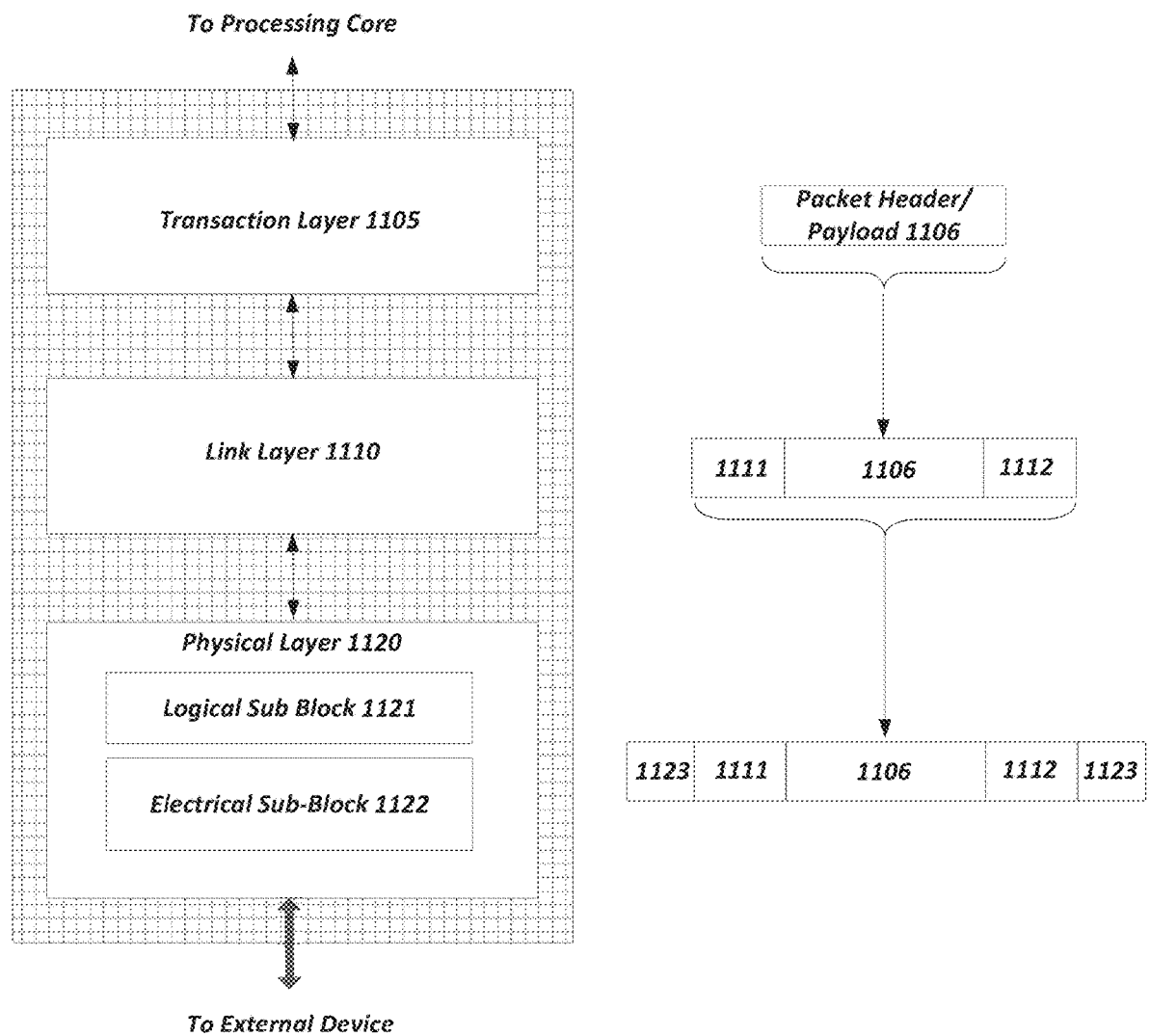
FIG. 11 illustrates an embodiment of an interconnect architecture including a layered stack.

Turning to FIG. 11 an embodiment of a layered protocol stack is illustrated. Layered protocol stack 1100 includes any form of a layered communication stack, such as a Quick Path Interconnect (QPI) stack, a PCIe stack, a next generation high performance computing interconnect stack, or other layered stack. Although the discussion immediately below in reference to FIGS. 10-15 are in relation to a PCIe stack, the same concepts may be applied to other interconnect stacks. In one embodiment, protocol stack 1100 is a PCIe protocol stack including transaction layer 1105, link layer 1110, and physical layer 1120. An interface, such as interfaces 1017, 1018, 1021, 1022, 1026, and 1031 in FIG. 10, may be represented as communication protocol stack 1100. Representation as a communication protocol stack may also be referred to as a module or interface implementing/including a protocol stack.

PCI Express uses packets to communicate information between components. Packets are formed in the Transaction Layer 1105 and Data Link Layer 1110 to carry the information from the transmitting component to the receiving component. As the transmitted packets flow through the other layers, they are extended with additional information necessary to handle packets at those layers. At the receiving side the reverse process occurs and packets get transformed from their Physical Layer 1120 representation to the Data Link Layer 1110 representation and finally (for Transaction Layer Packets) to the form that can be processed by the Transaction Layer 705 of the receiving device.

Transaction Layer

In one embodiment, transaction layer 1105 is to provide an interface between a device's processing core and the interconnect architecture, such as data link layer 1110 and physical layer 1120. In this regard, a primary responsibility of the transaction layer 1105 is the assembly and disassembly of packets (i.e., transaction layer packets, or TLPs). The translation layer 1105 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1105. An external device at the opposite end of the link, such as controller hub 1015 in FIG. 10, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1105 assembles packet header/payload 1106. Format for current packet headers/payloads may be found in the PCIe specification at the PCIe specification website.

Figure 12:
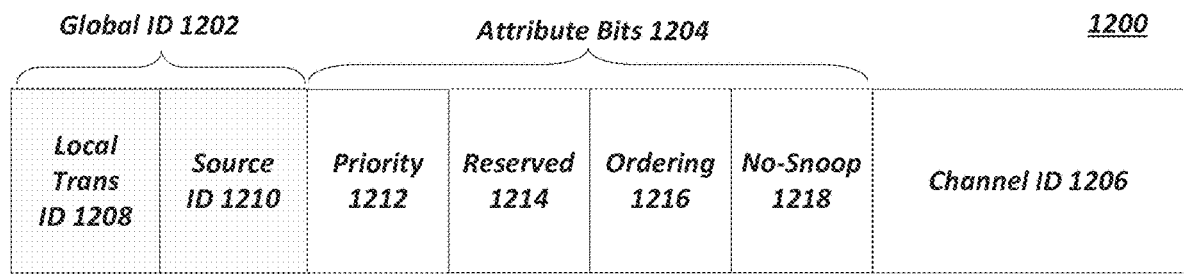
FIG. 12 illustrates an embodiment of a request or packet to be generated or received within an interconnect architecture.

Quickly referring to FIG. 12, an embodiment of a PCIe transaction descriptor is illustrated. In one embodiment, transaction descriptor 1200 is a mechanism for carrying transaction information. In this regard, transaction descriptor 1200 supports identification of transactions in a system. Other potential uses include tracking modifications of default transaction ordering and association of transaction with channels.

Transaction descriptor 1200 includes global identifier field 1202, attributes field 1204, and channel identifier field 1206. In the illustrated example, global identifier field 1202 is depicted comprising local transaction identifier field 1208 and source identifier field 1210. In one embodiment, global transaction identifier 1202 is unique for all outstanding requests.

According to one implementation, local transaction identifier field 1208 is a field generated by a requesting agent, and it is unique for all outstanding requests that require a completion for that requesting agent. Furthermore, in this example, source identifier 1210 uniquely identifies the requestor agent within a PCIe hierarchy. Accordingly, together with source ID 1210, local transaction identifier 1208 field provides global identification of a transaction within a hierarchy domain.

Attributes field 1204 specifies characteristics and relationships of the transaction. In this regard, attributes field 1204 is potentially used to provide additional information that allows modification of the default handling of transactions. In one embodiment, attributes field 1204 includes priority field 1212, reserved field 1214, ordering field 1216, and no-snoop field 1218. Here, priority sub-field 1212 may be modified by an initiator to assign a priority to the transaction. Reserved attribute field 1214 is left reserved for future, or vendor-defined usage. Possible usage models using priority or security attributes may be implemented using the reserved attribute field.

In this example, ordering attribute field 1216 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1218 is utilized to determine if transactions are snooped. As shown, channel ID Field 1206 identifies a channel that a transaction is associated with.

Link Layer

Link layer 1110, also referred to as data link layer 1110, acts as an intermediate stage between transaction layer 1105 and the physical layer 1120. In one embodiment, a responsibility of the data link layer 1110 is providing a reliable mechanism for exchanging Transaction Layer Packets (TLPs) between two components a link. One side of the Data Link Layer 1110 accepts TLPs assembled by the Transaction Layer 1105, applies packet sequence identifier 1111, i.e. an identification number or packet number, calculates and applies an error detection code, i.e. CRC 1112, and submits the modified TLPs to the Physical Layer 1120 for transmission across a physical to an external device.

Physical Layer

In one embodiment, physical layer 1120 includes logical sub block 1121 and electrical sub-block 1122 to physically transmit a packet to an external device. Here, logical sub-block 1121 is responsible for the "digital" functions of Physical Layer 1121. In this regard, the logical sub-block includes a transmit section to prepare outgoing information for transmission by physical sub-block 1122, and a receiver section to identify and prepare received information before passing it to the Link Layer 1110.

Physical block 1122 includes a transmitter and a receiver. The transmitter is supplied by logical sub-block 1121 with symbols, which the transmitter serializes and transmits onto to an external device. The receiver is supplied with serialized symbols from an external device and transforms the received signals into a bit-stream. The bit-stream is de-serialized and supplied to logical sub-block 1121. In one embodiment, an 8b/10b transmission code is employed, where ten-bit symbols are transmitted/received. Here, special symbols are used to frame a packet with frames 1123. In addition, in one example, the receiver also provides a symbol clock recovered from the incoming serial stream.

As stated above, although transaction layer 1105, link layer 1110, and physical layer 1120 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 13:
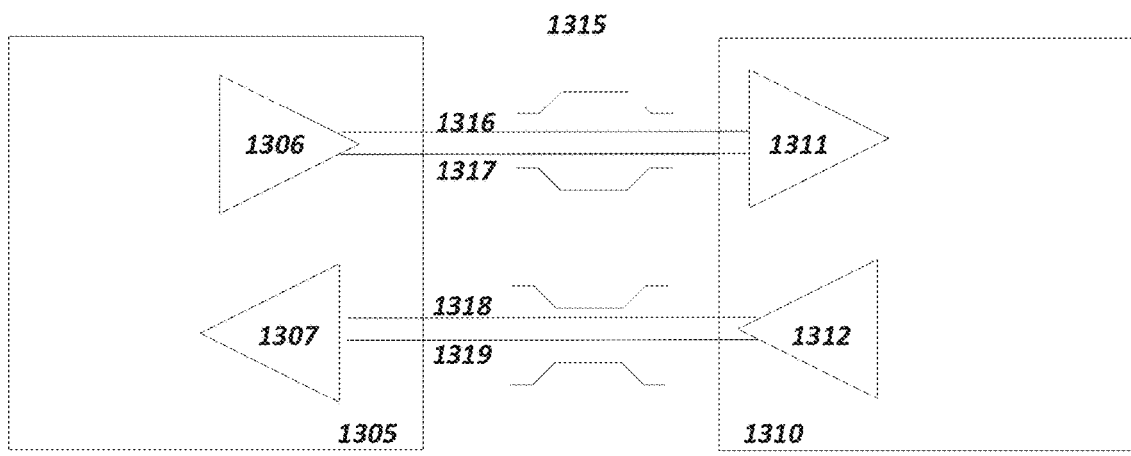
FIG. 13 illustrates an embodiment of a transmitter and receiver pair for an interconnect architecture.

Referring next to FIG. 13, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1306/1311 and a receive pair 1312/1307. Accordingly, device 1305 includes transmission logic 1306 to transmit data to device 1310 and receiving logic 1307 to receive data from device 1310. In other words, two transmitting paths, i.e. paths 1316 and 1317, and two receiving paths, i.e. paths 1318 and 1319, are included in a PCIe link.

A transmission path refers to any path for transmitting data, such as a transmission line, a copper line, an optical line, a wireless communication channel, an infrared communication link, or other communication path. A connection between two devices, such as device 1305 and device 1310, is referred to as a link, such as link 1315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1316 and 1317, to transmit differential signals. As an example, when line 1316 toggles from a low voltage level to a high voltage level, i.e. a rising edge, line 1317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 14:
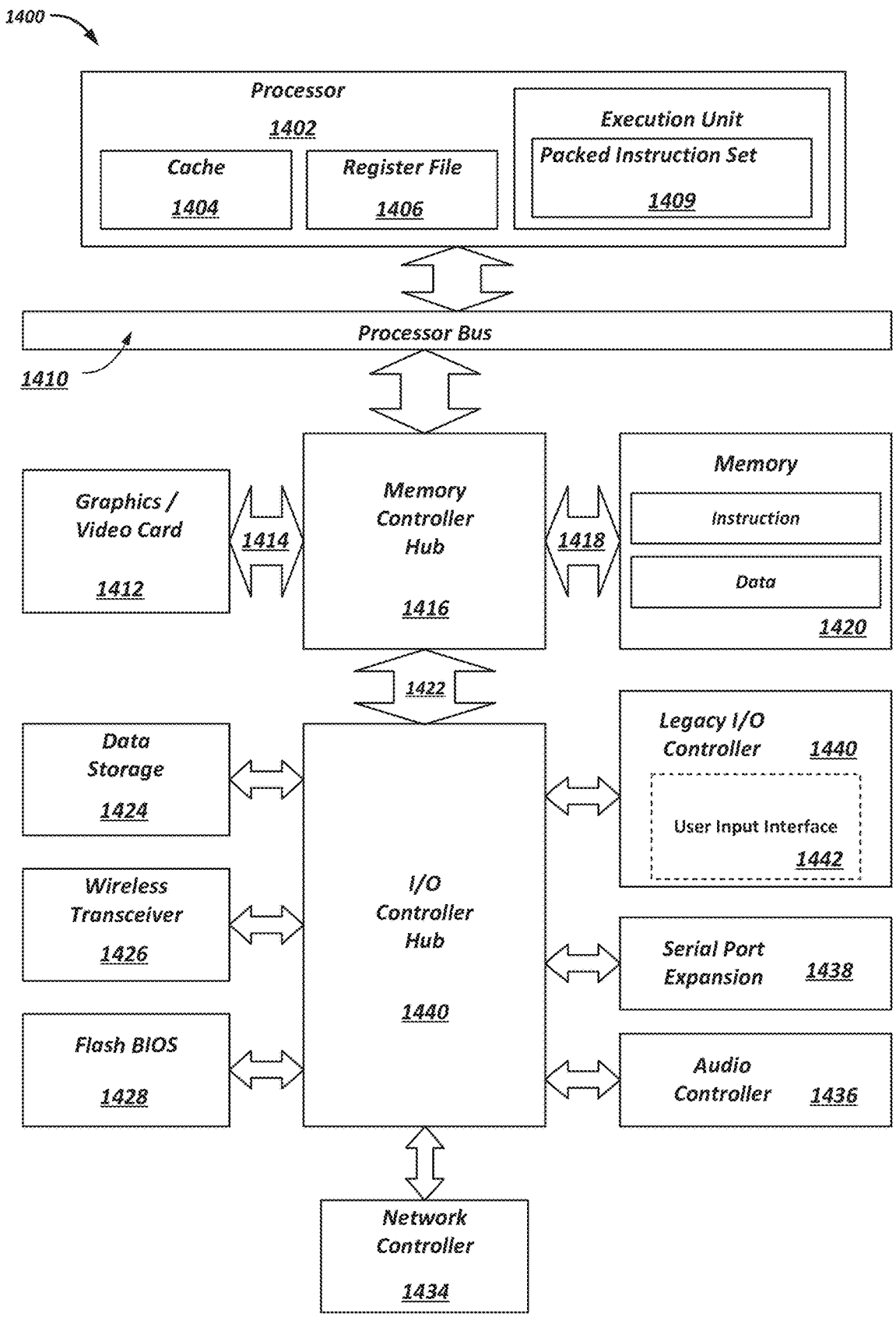
FIG. 14 illustrates another embodiment of a block diagram for a computing system including a processor.

Turning to FIG. 14, a block diagram of an exemplary computer system formed with a processor that includes execution units to execute an instruction, where one or more of the interconnects implement one or more features in accordance with one embodiment of the present disclosure is illustrated. System 1400 includes a component, such as a processor 1402 to employ execution units including logic to perform algorithms for process data, in accordance with the present disclosure, such as in the embodiment described herein. System 1400 is representative of processing systems based on the PENTIUM III™, PENTIUM 4™, Xeon™, Itanium, XScale™ and/or StrongARM™ microprocessors available from Intel Corporation of Santa Clara, California, although other systems (including PCs having other microprocessors, engineering workstations, set-top boxes and the like) may also be used. In one embodiment, sample system 1000 executes a version of the WINDOWS™ operating system available from Microsoft Corporation of Redmond, Washington, although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1402 includes one or more execution units 1008 to implement an algorithm that is to perform at least one instruction. One embodiment may be described in the context of a single processor desktop or server system, but alternative embodiments may be included in a multiprocessor system. System 1400 is an example of a 'hub' system architecture. The computer system 1400 includes a processor 1402 to process data signals. The processor 1402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1402 is coupled to a processor bus 1410 that transmits data signals between the processor 1402 and other components in the system 1400. The elements of system 1400 (e.g. graphics accelerator 1412, memory controller hub 1416, memory 1420, I/O controller hub 1424, wireless transceiver 1426, Flash BIOS 1028, Network controller 1434, Audio controller 1436, Serial expansion port 1438, I/O controller 1440, etc.) perform their conventional functions that are well known to those familiar with the art.

In one embodiment, the processor 1402 includes a Level 1 (L1) internal cache memory 1404. Depending on the architecture, the processor 1402 may have a single internal cache or multiple levels of internal caches. Other embodiments include a combination of both internal and external caches depending on the particular implementation and needs. Register file 1406 is to store different types of data in various registers including integer registers, floating point registers, vector registers, banked registers, shadow registers, checkpoint registers, status registers, and instruction pointer register.

Execution unit 1408, including logic to perform integer and floating point operations, also resides in the processor 1402. The processor 1402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1402. For one embodiment, execution unit 1408 includes logic to handle a packed instruction set 1409. By including the packed instruction set 1409 in the instruction set of a general-purpose processor 1402, along with associated circuitry to execute the instructions, the operations used by many multimedia applications may be performed using packed data in a general-purpose processor 1402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1408 may also be used in micro controllers, embedded processors, graphics devices, DSPs, and other types of logic circuits. System 1400 includes a memory 1420. Memory 1420 includes a dynamic random access memory (DRAM) device, a static random access memory (SRAM) device, flash memory device, or other memory device. Memory 1420 stores instructions and/or data represented by data signals that are to be executed by the processor 1402.

Note that any of the aforementioned features or aspects of the disclosure may be utilized on one or more interconnect illustrated in FIG. 14. For example, an on-die interconnect (ODI), which is not shown, for coupling internal units of processor 1402 implements one or more aspects of the disclosure described above. Or the disclosure is associated with a processor bus 1410 (e.g. Intel Quick Path Interconnect (QPI) or other known high performance computing interconnect), a high bandwidth memory path 1418 to memory 1420, a point-to-point link to graphics accelerator 1412 (e.g. a Peripheral Component Interconnect express (PCIe) compliant fabric), a controller hub interconnect 1422, an I/O or other interconnect (e.g. USB, PCI, PCIe) for coupling the other illustrated components. Some examples of such components include the audio controller 1436, firmware hub (flash BIOS) 1428, wireless transceiver 1426, data storage 1424, legacy I/O controller 1410 containing user input and keyboard interfaces 1442, a serial expansion port 1438 such as Universal Serial Bus (USB), and a network controller 1434. The data storage device 1424 can comprise a hard disk drive, a floppy disk drive, a CD-ROM device, a flash memory device, or other mass storage device.

Figure 15:
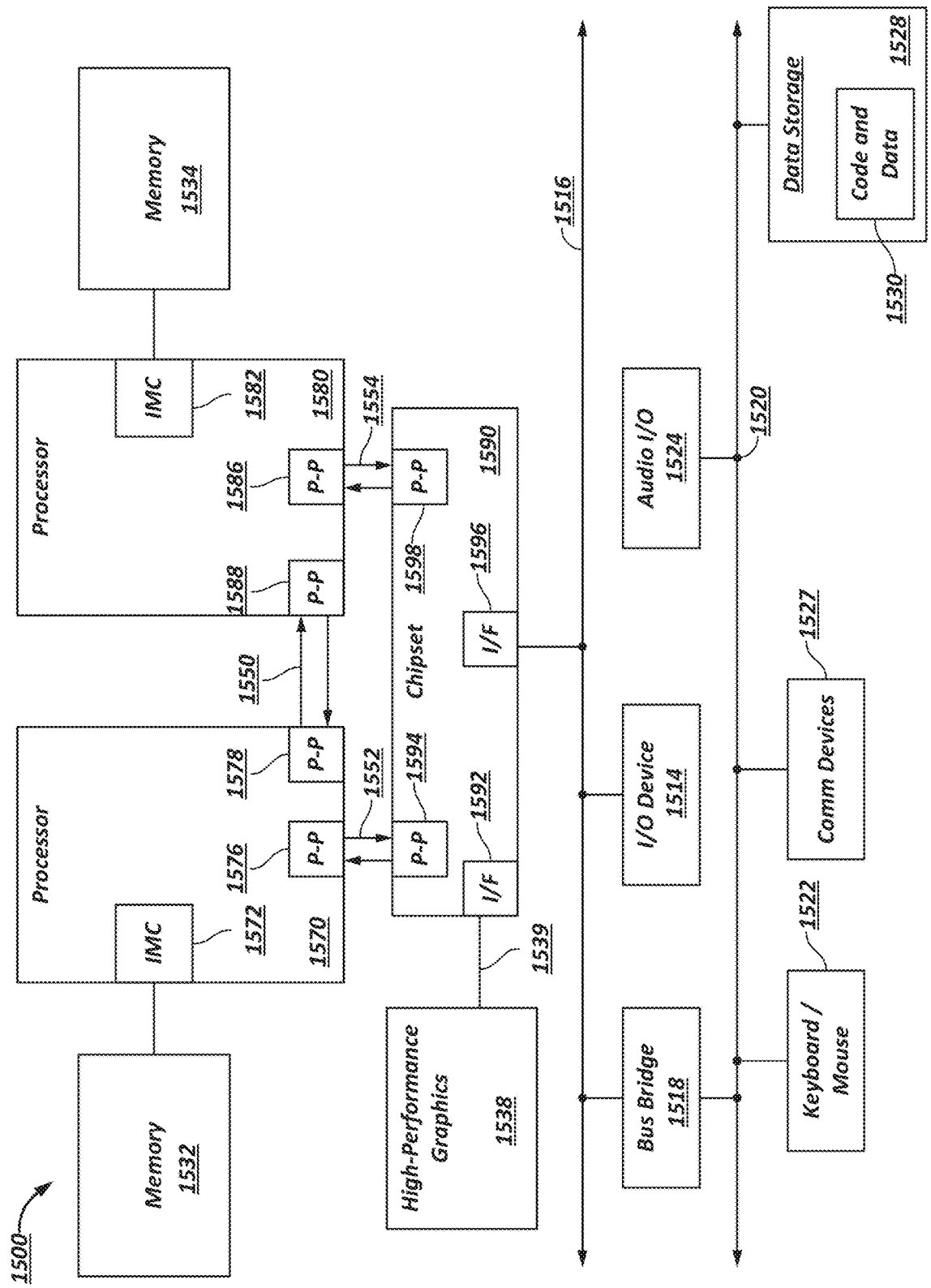
FIG. 15 illustrates an embodiment of a block for a computing system including multiple processor sockets.

Referring now to FIG. 15, shown is a block diagram of a second system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as Intel's Quick Path Interconnect (QPI) architecture. As a result, the disclosure may be implemented within the QPI architecture.

While shown with only two processors 1570, 1580, it is to be understood that the scope of the present disclosure is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1438 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 an apparatus comprising a port to receive flow control units (flits) across a serial interconnect, the flits comprising a first flit and subsequent flits; and a protocol stack comprising forward error correction (FEC) logic to identify a correctable error in the first flit using each of three error correcting code (ECC) groups, the FEC logic to correct the error using each of the ECC group; and an error log. The error log to log a symbol number in the first flit corrected by each ECC group, and a magnitude of the error corrected by each ECC group in the first flit.

Example 2 may include the subject matter of example 1, wherein the error log comprises information to indicate that each ECC group corrected an error in the first flit and that the first flit did not include an uncorrectable error.

Example 3 may include the subject matter of any of examples 1-2, wherein the magnitude of the error corrected by each ECC group comprises an amount of error correction with a symbol indicated by the symbol number.

Example 4 may include the subject matter of any of examples 1-3, wherein the error log comprises information indicating that at least one subsequent flit included an error, the error in the at least one subsequent flit comprising one of a correctable error or an uncorrectable error.

Example 5 may include the subject matter of example 4, wherein the error log is a first error log, the apparatus comprising a second error log to log a symbol number in at least one subsequent flit corrected by each ECC group, and a magnitude of the error corrected by each ECC group in the at least one subsequent flit.

Example 6 may include the subject matter of any of examples 1-5, wherein apparatus comprises a configuration register to log link error correlation.

Example 7 may include the subject matter of any of examples 1-6, further comprising cyclic redundancy check (CRC) logic to identify a correctable error in the first flit and to correct the error in the first flit, the FEC error log to log the correctable error corrected by the CRC logic.

Example 8 may include the subject matter of any of examples 1-7, wherein the FEC logic is to detect an uncorrectable error in the first flit, the apparatus further comprising an uncorrectable error log to log uncorrectable errors detected in the first flit.

Example 9 may include the subject matter of example 8, wherein the uncorrectable error log is to log a type of error in the at least one subsequent flit, the type of error comprising no error, a correctable error, or an uncorrectable error.

Example 10 may include the subject matter of example 8, further comprising a replay buffer to store an outgoing flit, the outgoing flit comprising the uncorrectable error detected by the FEC logic; error detection logic to compare a retried flit that does not include the uncorrectable error with the outgoing flit in the replay buffer; determine a bit position of the uncorrectable error based on the comparison; and log the bit position of the uncorrectable error in the error log.

Example 11 may include the subject matter of example 10, further comprising exclusive OR logic to compare the retried flit with the outgoing flit.

Example 12 may include the subject matter of example 8, further comprising error detection logic to determine by a SKP OS that a next flit will contain all zeros (all zero flit); and compare the next flit with all zeros to identify a bit location of an error in the next flit.

Example 13 is a method comprising receiving a first flow control unit (flit) at a port across a serial interconnect, the first flit a first flit of a series of flits to be received by the port; determining a correctable error in the first flit; correcting the correctable error in the first flit by each of three of error correcting code (ECC) groups; recording a symbol number in the first flit corrected by each ECC group in an error log; and recording a magnitude of the error corrected by each ECC group in the first flit in the error log.

Example 14 may include the subject matter of example 13, further comprising recording in the error log information indicating that each ECC group corrected an error in the first flit and that no uncorrectable errors were detected in the first flit.

Example 15 may include the subject matter of any of examples 13-14, wherein the magnitude of the error corrected by each ECC group comprises an amount of error correction with a symbol indicated by the symbol number.

Example 16 may include the subject matter of any of examples 13-15, further comprising detecting an uncorrectable error in the first flit; and recording the uncorrectable error in an uncorrectable errors log.

Example 17 may include the subject matter of example 16, further comprising recording in the uncorrectable errors log a type of error in the first flit, the type of error comprising no error, a correctable error, or an uncorrectable error.

Example 18 may include the subject matter of example 16, further comprising comparing a retried flit that does not include the uncorrectable error with an outgoing flit in a replay buffer; determine a bit position of the uncorrectable error based on the comparison; and log the bit position of the uncorrectable error in the error log.

Example 19 may include the subject matter of example 16, further comprising receiving a SKiP ordered set (SKP OS); determining by a SKP OS that a next flit will contain all zeros (all zero flit); comparing the next flit with all zero flit; and identifying a bit location of the uncorrectable error in the next flit based on the comparison.

Example 20 is a system comprising a hardware processor; a transmitter port for transmitting flow control units (flits) across a serial interconnect; a receiver port to receive flits from across a serial interconnect; a protocol stack comprising forward error correction (FEC) logic to identify a correctable error in the first flit, and correct the correctable error using three error correcting code (ECC) groups; and an error log, the correctable error log to log a symbol number in the first flit corrected by each ECC group, and to log a magnitude of the correctable error corrected by each ECC group in the first flit; and a configuration register to log link error correlation, the link error correlation comprising a indication of one or more bits in error in the first flit.

Example 21 may include the subject matter of example 20, wherein the magnitude of the error corrected by each ECC group comprises an amount of error correction with a symbol indicated by the symbol number.

Example 22 may include the subject matter of any of examples 20-21, wherein the system comprises an uncorrectable error log; and wherein the FEC logic is to detect an uncorrectable error in the first flit and to log the uncorrectable error detected in the first flit.

Example 23 may include the subject matter of example 22, wherein the uncorrectable error log is to log a type of error in the at least one subsequent flit, the type of error comprising no error, a correctable error, or an uncorrectable error.

Example 24 may include the subject matter of example 22, further comprising a replay buffer to store an outgoing flit, the outgoing flit comprising the uncorrectable error detected by the FEC logic; error detection logic to compare a retried flit that does not include the uncorrectable error with the outgoing flit in the replay buffer; determine a bit position of the uncorrectable error based on the comparison; and log the bit position of the uncorrectable error in the error log.

Example 25 may include the subject matter of example 24, further comprising exclusive OR logic to compare the retried flit with the outgoing flit.

Example 26 may include the subject matter of example 22, further comprising error detection logic to determine by a SKP OS that a next flit will contain all zeros (all zero flit); and compare the next flit with all zeros to identify a bit location of an error in the next flit.

Example 27 may include the subject matter of example 20, and can also include a retimer.

What is claimed is:

1. An apparatus comprising:
  a port to receive flow control units (flits) across a serial interconnect, the flits comprising a first flit and subsequent flits; and
  a protocol stack comprising:
    forward error correction (FEC) logic to identify a correctable error in the first flit using each of three error correcting code (ECC) groups, the FEC logic to correct the error using each of the ECC group; and
    an error log, the error log to log:
      a symbol number in the first flit corrected by each ECC group, and
      a magnitude of the error corrected by each ECC group in the first flit.

2. The apparatus of claim 1, wherein the error log comprises information to indicate that each ECC group corrected an error in the first flit and that the first flit did not include an uncorrectable error.

3. The apparatus of claim 1, wherein the magnitude of the error corrected by each ECC group comprises an amount of error correction with a symbol indicated by the symbol number.

4. The apparatus of claim 1, wherein the error log comprises information indicating that at least one subsequent flit included an error, the error in the at least one subsequent flit comprising one of a correctable error or an uncorrectable error.

5. The apparatus of claim 4, wherein the error log is a first error log, the apparatus comprising a second error log to log:
  a symbol number in at least one subsequent flit corrected by each ECC group, and
  a magnitude of the error corrected by each ECC group in the at least one subsequent flit.

6. The apparatus of claim 1, wherein apparatus comprises a configuration register to log link error correlation.

7. The apparatus of claim 1, further comprising cyclic redundancy check (CRC) logic to identify a correctable error in the first flit and to correct the error in the first flit, the FEC error log to log the correctable error corrected by the CRC logic.

8. The apparatus of claim 1, wherein the FEC logic is to detect an uncorrectable error in the first flit, the apparatus further comprising an uncorrectable error log to log uncorrectable errors detected in the first flit.

9. The apparatus of claim 8, wherein the uncorrectable error log is to log a type of error in the first flit, the type of error comprising no error, a correctable error, or an uncorrectable error.

10. The apparatus of claim 8, further comprising:
a replay buffer to store an outgoing flit, the outgoing flit comprising the uncorrectable error detected by the FEC logic; and
error detection logic to:
compare a retried flit that does not include the uncorrectable error with the outgoing flit in the replay buffer;
determine a bit position of the uncorrectable error based on the comparison; and
log the bit position of the uncorrectable error in the error log.

11. The apparatus of claim 10, further comprising exclusive OR logic to compare the retried flit with the outgoing flit.

12. The apparatus of claim 8, further comprising error detection logic to:
determine by a SKP OS that a next flit will contain all zeros (all zero flit); and
compare the next flit with all zeros to identify a bit location of an error in the next flit.

13. A method comprising:
receiving a first flow control unit (flit) at a port across a serial interconnect, the first flit a first flit of a series of flits to be received by the port;
determining a correctable error in the first flit;
correcting the correctable error in the first flit by each of three of error correcting code (ECC) groups;
recording a symbol number in the first flit corrected by each ECC group in an error log; and
recording a magnitude of the error corrected by each ECC group in the first flit in the error log.

14. The method of claim 13, further comprising recording in the error log information indicating that each ECC group corrected an error in the first flit and that no uncorrectable errors were detected in the first flit.

15. The method of claim 13, wherein the magnitude of the error corrected by each ECC group comprises an amount of error correction with a symbol indicated by the symbol number.

16. The method of claim 13, further comprising:
detecting an uncorrectable error in the first flit; and
recording the uncorrectable error in an uncorrectable errors log.

17. The method of claim 16, further comprising recording in the uncorrectable errors log a type of error in the first flit, the type of error comprising no error, a correctable error, or an uncorrectable error.

18. The method of claim 16, further comprising:
comparing a retried flit that does not include the uncorrectable error with an outgoing flit in a replay buffer;
determine a bit position of the uncorrectable error based on the comparison; and
log the bit position of the uncorrectable error in the error log.

19. The method of claim 16, further comprising:
receiving a SKiP ordered set (SKP OS);
determining by a SKP OS that a next flit will contain all zeros (all zero flit);
comparing the next flit with all zero flit; and
identifying a bit location of the uncorrectable error in the next flit based on the comparison.

20. A system comprising:
a hardware processor;
a transmitter port for transmitting flow control units (flits) across a serial interconnect;
a receiver port to receive flits from across a serial interconnect;
a protocol stack comprising:
forward error correction (FEC) logic to:
identify a correctable error in a first flit, and
correct the correctable error using three error correcting code (ECC) groups; and
an error log, the correctable error log to log a symbol number in the first flit corrected by each ECC group, and to log a magnitude of the correctable error corrected by each ECC group in the first flit; and
a configuration register to log link error correlation, the link error correlation comprising a indication of one or more bits in error in the first flit.

21. The system of claim 20, wherein the magnitude of the error corrected by each ECC group comprises an amount of error correction with a symbol indicated by the symbol number.

22. The system of claim 20, wherein the system comprises an uncorrectable error log; and wherein the FEC logic is to detect an uncorrectable error in the first flit and to log the uncorrectable error detected in the first flit.

23. The system of claim 22, wherein the uncorrectable error log is to log a type of error in the first flit, the type of error comprising no error, a correctable error, or an uncorrectable error.

24. The system of claim 22, further comprising:
a replay buffer to store an outgoing flit, the outgoing flit comprising the uncorrectable error detected by the FEC logic; and
error detection logic to:
compare a retried flit that does not include the uncorrectable error with the outgoing flit in the replay buffer;
determine a bit position of the uncorrectable error based on the comparison; and
log the bit position of the uncorrectable error in the error log.

25. The system of claim 24, further comprising exclusive OR logic to compare the retried flit with the outgoing flit.

26. The system of claim 22, further comprising error detection logic to:
determine by a SKP OS that a next flit will contain all zeros (all zero flit); and
compare the next flit with all zeros to identify a bit location of an error in the next flit.

* * * * *